(12) United States Patent
Gage

(10) Patent No.: US 10,158,568 B2
(45) Date of Patent: Dec. 18, 2018

(54) METHOD AND APPARATUS FOR SERVICE FUNCTION FORWARDING IN A SERVICE DOMAIN

(71) Applicant: William Anthony Gage, Stittsville (CA)

(72) Inventor: William Anthony Gage, Stittsville (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 10 days.

(21) Appl. No.: 15/428,748

(22) Filed: Feb. 9, 2017

(65) Prior Publication Data

US 2017/0237656 A1    Aug. 17, 2017

Related U.S. Application Data

(60) Provisional application No. 62/294,456, filed on Feb. 12, 2016.

(51) Int. Cl.
*H04L 12/28* (2006.01)
*H04L 12/741* (2013.01)
(Continued)

(52) U.S. Cl.
CPC ............ *H04L 45/74* (2013.01); *H04L 45/306* (2013.01); *H04L 61/2007* (2013.01);
(Continued)

(58) Field of Classification Search
CPC .............................. H04L 45/74; H04L 61/2007
See application file for complete search history.

(56) References Cited

U.S. PATENT DOCUMENTS

2014/0334295 A1* 11/2014 Guichard ............ H04L 47/2475
370/230
2014/0362682 A1* 12/2014 Guichard ............ H04L 41/5038
370/221
(Continued)

FOREIGN PATENT DOCUMENTS

CN    104639414 A    5/2015
CN    106330714 A    1/2017
(Continued)

OTHER PUBLICATIONS

IETF RFC 2827 Network Ingress Filtering: Defeating Denial of Service Attacks which employ IP Source 8 Address Spoofing. P. Ferguson et al. May 2000.
(Continued)

*Primary Examiner* — Clemence S Han

(57) ABSTRACT

Solutions to packet forwarding along a service function path (SFP) by using packet-based transport are provided, where the destination address field in the transport tunnel packet header designates the SFP and the source address field contains the service context. Forwarding of packet flows in different SFPs is simplified by using conventional packet routing and forwarding mechanisms and commercial off-the-shelf routers and switches. For example, route aggregation, load balancing, equal cost multipath routing, and fast path restoration can be applied to service function paths.

26 Claims, 15 Drawing Sheets

SFH Path Identifier as IPv6 Destination Address

SFH Service Context as IPv6 Source Address

(51) Int. Cl.
*H04L 29/12* (2006.01)
*H04L 12/725* (2013.01)

(52) U.S. Cl.
CPC ...... *H04L 61/2521* (2013.01); *H04L 61/2503* (2013.01); *H04L 61/6059* (2013.01); *H04L 61/6068* (2013.01)

(56) References Cited

U.S. PATENT DOCUMENTS

| | | | |
|---|---|---|---|
| 2015/0026362 A1* | 1/2015 | Guichard | H04L 45/30 709/242 |
| 2016/0352629 A1* | 12/2016 | Wang | H04L 45/38 |
| 2017/0005920 A1* | 1/2017 | Previdi | H04L 45/306 |
| 2017/0111267 A1* | 4/2017 | Lin | H04L 45/38 |
| 2017/0163531 A1* | 6/2017 | Kumar | H04L 45/74 |
| 2017/0230467 A1* | 8/2017 | Salgueiro | H04L 67/16 |
| 2017/0324654 A1* | 11/2017 | Previdi | H04L 69/22 |
| 2017/0359255 A1* | 12/2017 | Manghirmalani | H04L 69/22 |
| 2018/0013585 A1* | 1/2018 | Salgueiro | H04L 45/74 |
| 2018/0041428 A1* | 2/2018 | Wan | H04L 45/306 |
| 2018/0054389 A1* | 2/2018 | Ao | H04L 47/125 |
| 2018/0102919 A1* | 4/2018 | Hao | H04L 12/4633 |

FOREIGN PATENT DOCUMENTS

| | | |
|---|---|---|
| WO | 2016000513 A1 | 1/2016 |
| WO | 2016045710 A1 | 3/2016 |

OTHER PUBLICATIONS

IETF RFC 4291 IP Version 6 Addressing Architecture. R. Hinden et al. Feb. 2006.
IETF RFC «draft» IPv6 Segment Routing Header (SRH). S. Previdi, Ed. et al. Mar. 18, 2016.
IETF Multi-Protocol Label Switching, «http://datatracker.ietf.org/wg/mpls/», Oct. 16, 2015.
IETF Service Function Chaining, «http://datatracker.ietf.org/wg/sfc,/», Oct. 29, 2015.
Internet Assigned Numbers Authority, "Protocol Numbers", «http://www.iana.org/assignments/protocol-18 numbers/», Jan. 31, 2017.
Internet Assigned Numbers Authority, "IPv6 Extension Header Types", «http://www.iana.org/assignments/ipv6-20parameters/», Jan. 26, 2017.
IETF RFC «draft» IPv6 Service function Chain. C. Wang et al. Jan. 6, 2016.
NGMN Alliance, Peter Redman, Ed., "Description of Network Slicing Concept", Jan. 2016.
P. Quinn, Ed., et al., Network Service Header draft-ietf-sfc-nsh-02.txt, Jan. 19, 2016.
J. Halpern, Ed., et al., Internet Engineering Task Force (IETF) Service Function Chaining (SFC) Architecture RFC7665, Oct. 31, 2015.
International Search Report dated Apr. 27, 2017 for corresponding International Application No. PCT/CN2017/073220 filed Feb. 10, 2017.

\* cited by examiner

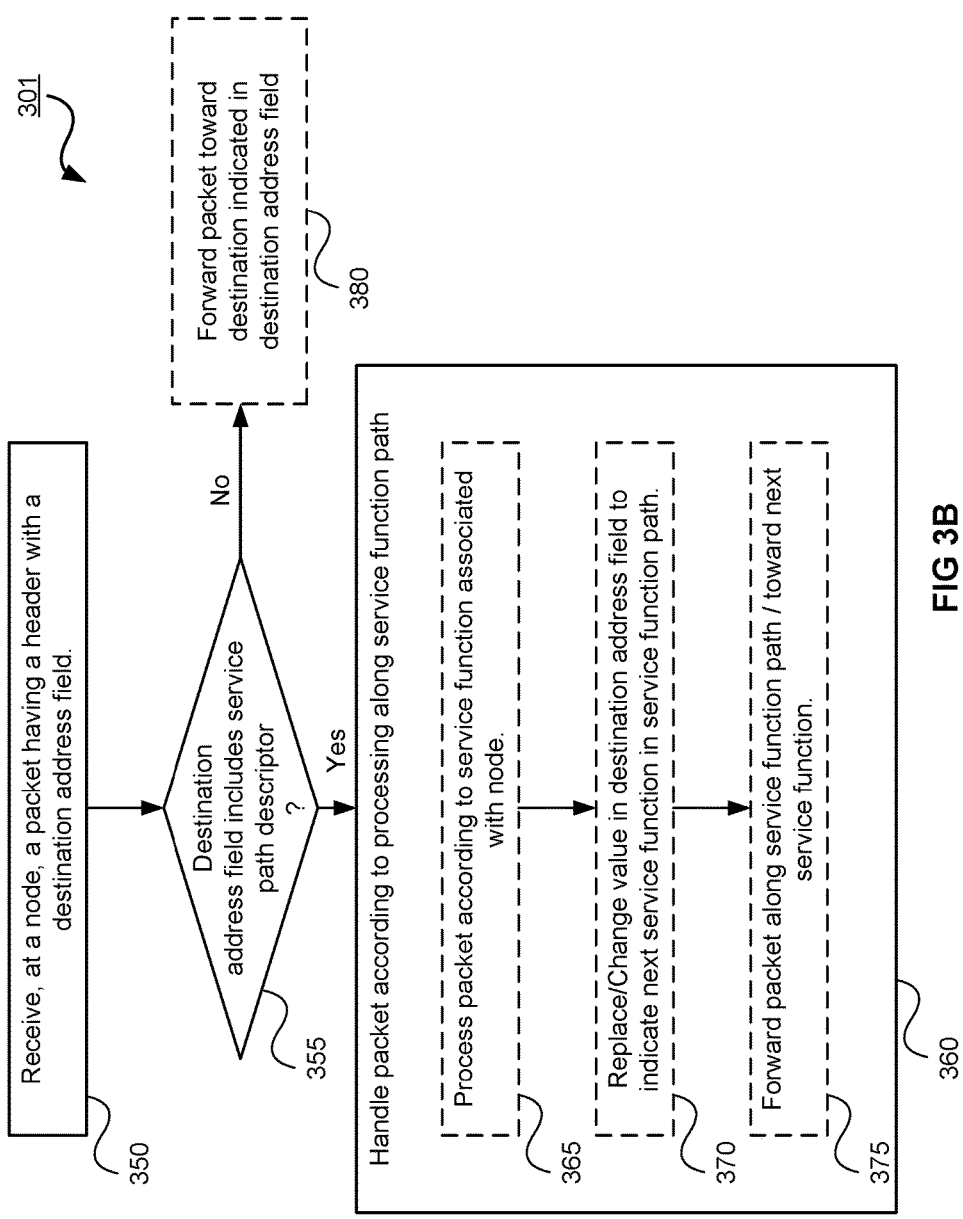

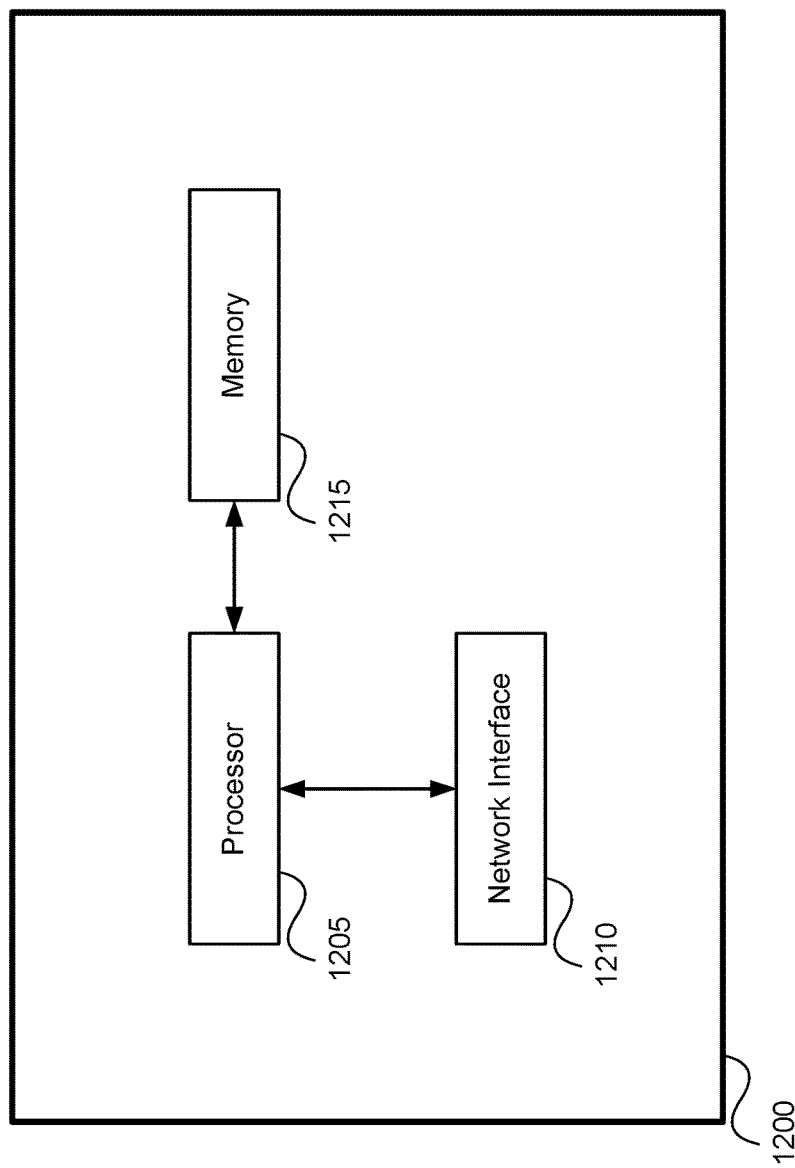

METHOD AND APPARATUS FOR SERVICE FUNCTION FORWARDING IN A SERVICE DOMAIN

CROSS REFERENCE TO RELATED APPLICATIONS

This application claims the benefit of priority to U.S. Provisional Patent Application Ser. No. 62/294,456 filed Feb. 12, 2016, entitled "METHOD AND APPARATUS FOR SERVICE FUNCTION FORWARDING IN A SERVICE DOMAIN", the contents of which are incorporated herein by reference.

FIELD OF THE INVENTION

The present invention pertains to the field of packet-based data communications and in particular to a method and apparatus for service function forwarding in a service domain.

BACKGROUND

In data communication networks, service function chaining and service function forwarding can be used for forwarding of data packets along a predetermined service function path through the network. Internet Engineering Task Force (IETF) Request for Comments (RFC) document 7665, entitled "Service Function Chaining (SFC) Architecture," October 2015 and referred to herein as RFC 7665, describes various aspects of service function chains, service functions, service function paths, service function forwarders, and service nodes. According to RFC 7665, a Service Function Chain may define an ordered set of abstract Service Functions (SF) and ordering constraints that must be applied to packets and/or flows selected as a result of classification. Also according to RFC 7665, a SF is responsible for specific treatment of received packets, and can be realized as a virtual element or be embedded in (instantiated upon) a physical network element. For example, a SF can be implemented using a virtual function instantiated in the network (e.g. within a virtual machine instantiated in a data center, or within a container created within a computing platform) or using a physical node configured to perform the service function. Also according to RFC 7665, a Service Function Path (SFP) is a constrained specification of where packets assigned to a certain service must go.

A draft IETF RFC document entitled "Network Service Header," (draft-ietf-sfc-nsh), available via https://tools.ietforg/html/draft-ietf-sfc-nsh-05, describes a Network Service Header (NSH) carried by a packet which can provide service function path identification and can be used by NSH-aware functions such as service function forwarders and service functions. The NSH can also carry data plane metadata. A service function forwarder (SFF) is responsible for forwarding traffic to one or more service functions in an SFP according to information carried in the NSH.

IPv6 packet headers include a 128-bit source address field, a 128-bit destination address field, and other fields labelled as IP version, traffic class, flow label, payload length, and next header fields. The source address and destination address fields include a routing prefix portion composed of a global prefix portion and a subnet prefix portion, and an endpoint identifier portion. The source and destination addresses are intended to identify the source network device from which the packet originated and the destination network device for which the packet is intended respectively. Similar address fields (and an IP version field) exist in an IPv4 packet header.

Existing approaches for handling packets according to service function chaining can require specialized equipment to implement. Such approaches can also be limited in their ability to: convey ancillary information or metadata; perform adaptive routing within the service function domain; and/or use other conventional packet forwarding mechanisms. Examples of conventional packet forwarding mechanisms include equal cost multipath selection, load balancing, source routing and fast path restoration. Therefore there is a need for a method and apparatus for forwarding packets along a service function path in a service domain that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for service function forwarding in a packet data service domain, such as an IPv4 or IPv6 or Ethernet service domain. In accordance with embodiments of the present invention, there is provided a method for forwarding a packet along a service function path (e.g. inside a packet data network). The method includes, by a network node device: receiving the packet having a header which includes a destination address field. The method further includes, by the network node device, forwarding the packet to one of a service node associated with the network node and a subsequent network node in the service function path in accordance with a service path descriptor carried within the destination address field.

In accordance with other embodiments of the present invention, there is provided an apparatus located inside a service domain (e.g. of a packet data network). The apparatus includes a network interface for receiving and transmitting packets, a computer processor, and a memory device storing instructions for execution by the processor. When executed, the instructions cause the apparatus to process a packet received via the network interface. The packet being processed has a header which includes a destination address field. The instructions further cause the apparatus to forward the packet to one of a service node associated with the network node and a subsequent network node in the service function path in accordance with a service path descriptor carried within the destination address field.

In accordance with other embodiments of the present invention, there is provided a method for processing and forwarding data packets at an ingress network node device, for example of a service domain, in a packet data network. The method includes, by the network node device, receiving a data packet. The method further includes, by the network node device, in response to a determination that the received data packet is to be forwarded along a service function path, encapsulating the data packet within a tunnel packet. The method further includes, by the network node device, inserting, into a header of the tunnel packet, one or both of: a service path descriptor indicative of the service function path to be followed by the tunnel packet; and service context information usable by one or more service functions along the service function path for processing the data packet. The method further includes, by the network node device, transmitting (forwarding) the tunnel packet towards a service function associated with the service function path.

In accordance with other embodiments of the present invention, there is provided an ingress network node device in a packet data network. The ingress network node device includes a network interface for receiving and transmitting data packets, a computer processor and a memory device storing instructions for execution by the processor. The instructions, when executed by the processor, cause the ingress node, in response to a determination that a data packet received by the network interface is to be forwarded along a service function path, to encapsulate the data packet within a tunnel packet. The instructions further cause the ingress node to insert, into a header of the tunnel packet, one or both of: a service path descriptor indicative of the service function path to be followed by the tunnel packet; and service context information usable by one or more service functions along the service function path for processing the data packet. The instructions further cause the ingress node to transmit the tunnel packet, over the network interface, towards a service function associated with the service function path.

In some embodiments, the ingress network node device above is further configured to modify the header of the tunnel packet to include one or more of: an indicator that the header of the tunnel packet includes the service path descriptor; an indicator that the tunnel packet is to be routed along the service function path; a service function index indicative of which of one or more service functions along the service function path is to receive the tunnel packet next, the service function index being updatable by one or more functions along the service path; and auxiliary context usable by one or more functions along the service path.

In some embodiments, the ingress network node device above is further configured to modify the header of the tunnel packet to include service context comprising one or more of: a context group indicative of structure and content of service context information included in the tunnel packet; a context type indicative of content included in the tunnel packet; and service context information usable by one or more service functions along the service function path for processing the data packet encapsulated within the tunnel packet. In some embodiments, a source address field of the tunnel packet header includes the service context.

BRIEF DESCRIPTION OF THE FIGURES

Further features and advantages of the present invention will become apparent from the following detailed description, taken in combination with the appended drawings, in which:

FIG. 3B illustrates a method for processing and forwarding tunnel packets inside a service domain of a packet data network, according to another embodiment of the present invention.

FIG. 12 illustrates a network apparatus provided in accordance with an embodiment of the present invention.

It will be noted that throughout the appended drawings, like features are identified by like reference numerals.

DETAILED DESCRIPTION

Embodiments of the present invention provide solutions to packet forwarding along a service function path (SFP) by using an IP transport, such as IP-in-IP tunnelling, where the IP destination address in the transport tunnel packet header designates the SFP and the IP source address in the transport tunnel packet header contains the service context. Forwarding of packets in different SFPs is simplified by using conventional IP routing and forwarding mechanisms and commercial off-the-shelf routers. For example, route aggregation, load balancing, equal cost multipath routing, and fast path restoration can be easily applied to service function paths.

Figure 1:
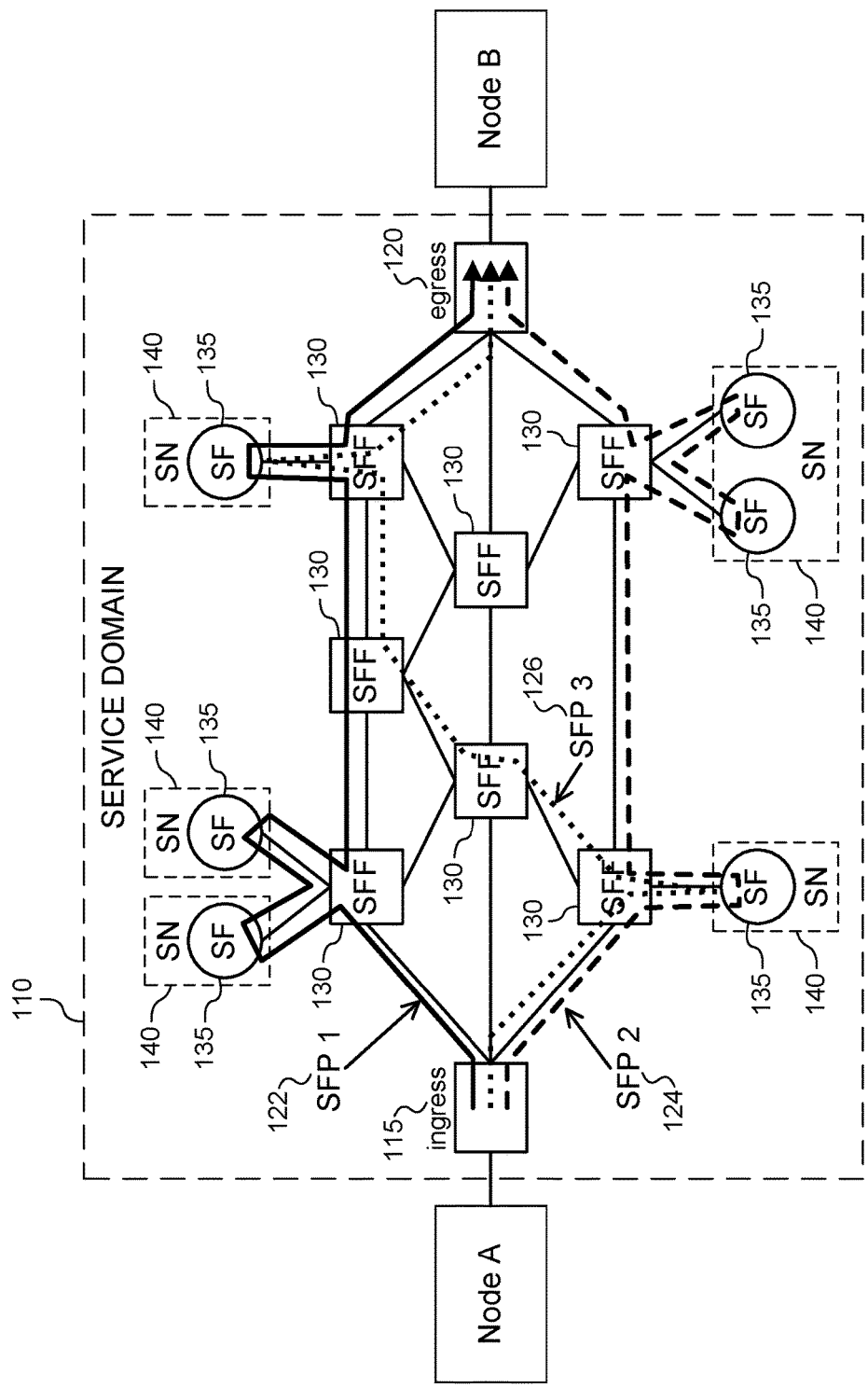
FIG. 1 illustrates service function forwarding along service function paths, according to an embodiment of the present invention.

FIG. 1 illustrates an example of service function forwarding along service function paths, implementation of which may proceed in accordance with embodiments of the present invention. A service function path (SFP) is a network path through which packets associated with a specified service are routed. At each node/network function along the SFP, a different function can be applied to the packets. In some implementations, the SFP can be very specific and specify the exact network locations along the path (e.g. using exact network addresses). In other implementations, a range of network locations can be specified for at least one portion of the path, with the packets being free to be forwarded to any location within the range. The SFP may therefore specify how service-associated packets are to be handled at a variable level of specificity. This level of specificity may lie between the abstract specification of a service chain as a sequence of abstract service functions to be delivered, and a full specification of exactly which SFF/SFs a service-associated packet will visit when it actually traverses the network. A packet enters a service domain 110 via an ingress node 115 and exits the service domain via an egress node 120. Although in the simplified example of FIG. 1, there is a single ingress node 115 and a single egress node 120, in other embodiments, there may be multiple ingress nodes 115 and multiple egress nodes 120 within a service domain. Within the service domain 110, a packet can be forwarded along a particular SFP, such as SFP1 122(solid line), SFP2 (dashed line) 124, and SFP3 (dotted line) 126. Nodes or virtual functions operating as service function forwarders (SFFs) 130 are responsible for forwarding traffic to connected service functions (SF) 135. Each SFF can use information stored in the packet header (also referred to as packet header information) to determine which, if any, connected SFs to send the packet to. When the SF 135 has finished processing the packet, the processed packet is returned to the SFF 130 which is further responsible for transmitting the packet to the next SFF. Service nodes (SNs) 140 host one or more service functions (SFs) and have one or more SFFs associated with them. The SFFs can be used to forward packets to the SFs, thereby making the SFs reachable by packets in the network. Further details in relation to the above definitions can be found for example in RFC 7665. In contrast to RFC 7665, embodiments of the present invention employ conventional IP routing and forwarding functions (RFF) rather than specialised SFFs for forwarding a packet along a designated SFP.

Figure 2:
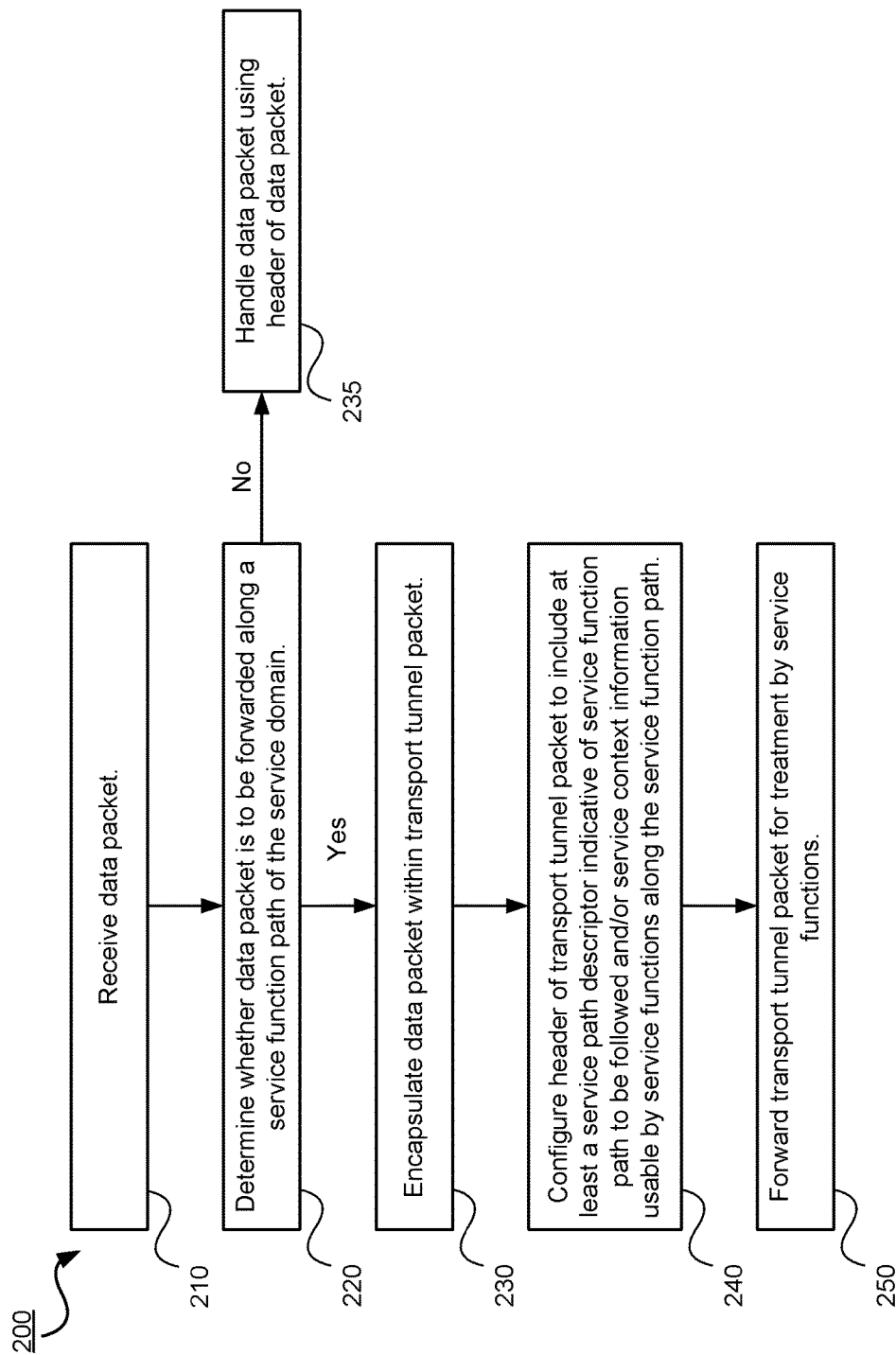
FIG. 2 illustrates a method for processing and forwarding data packets at an ingress of a service domain in a packet data network, according to an embodiment of the present invention.

Having reference to FIG. 2, embodiments of the present invention provide for a method 200 for processing and forwarding data packets that can be carried out at an ingress node of a service domain. The method can be implemented by a network node device such as a classifier or ingress node comprising at least a network interface, processor and memory component. The method includes receiving 210 a data packet such as an IPv4 packet, an IPv6 packet, an Ethernet frame, or a similar protocol data unit. The method may further include making a determination 220 of whether the data packet is to be forwarded along a service function path of the service domain. The method further includes encapsulating 230 the data packet within a transport tunnel packet. The step of encapsulation may be performed in response to the determination that the data packet is to be transmitted along a service function path. The transport tunnel packet refers to a packet which encapsulates the data packet. Otherwise, the data packet may be handled 235 by forwarding it along a data path determined in accordance with the data packet's header information (e.g. according to the destination address). The method further includes configuring 240 a header of the transport tunnel packet to include a service path descriptor indicative of the service function path to be followed by the transport tunnel packet and/or service context information usable by service functions along the service function path. The method further includes forwarding 250 the transport tunnel packet for treatment by one or more service functions along the service function path.

Figure 3A:
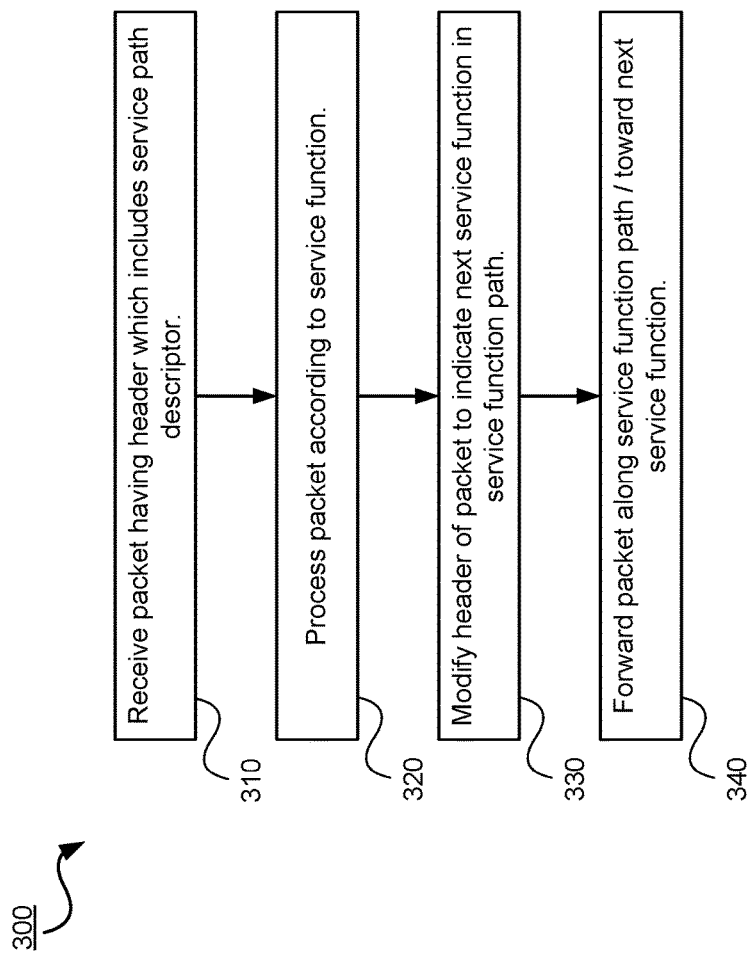
FIG. 3A illustrates a method for processing and forwarding tunnel packets inside a service domain of a packet data network, according to an embodiment of the present invention.

Having reference to FIG. 3A, embodiments of the present invention provide for a method 300 for processing and forwarding data packets that can be carried out by nodes or functions, such as those inside a service domain of a packet data network. The method 300 can be implemented by a network node device such as a service node comprising at least a network interface, processor and memory component. The method 300 includes receiving 310 a packet having an associated service path descriptor. In some embodiments, the packet can have a header which includes a service path descriptor. In some embodiments, the service path descriptor may be indicative of a service function path to be followed by the packet. The method further includes processing 320 the packet according to a service function hosted by the apparatus. In various embodiments, the packet may be processed to implement a service function such as but not necessarily limited to: a firewall; a malware detector; an intrusion detector; a traffic policing, marking and/or shaping function; a load balancer; a protocol enhancement proxy; a data compressor; an HTTP proxy; a network cache; a deep packet inspection function; a mobility anchor; a network address translator; a VPN gateway; an accounting function; a statistical analyser; a performance monitor; and a lawful intercept function. The method further includes modifying 330 the header to indicate a next service function in the service function path which is to receive and/or process the packet. The method further includes forwarding 340 the packet along the service function path, toward the next service function.

FIG. 3B illustrates a method 301 for forwarding a data packet along a service function path inside a service domain of a packet data network, according to another embodiment of the present invention. The method can be implemented by a network node device. In more detail, the method includes receiving 350 a packet, the packet including a header, such as an IP header, which in turn includes a destination address field. The destination address field may include a service path descriptor indicative of a service function path to be followed by the packet. The method includes determining 355 whether the destination address field includes such a service path descriptor (e.g. the packet is a transport tunnel packet for use according to the present invention). If a service path descriptor is detected via such a determination, the method includes processing 360 the packet according to processing along the service function path. That is, the packet is processed via functions along the service function path indicated by the service path descriptor. In some embodiments, information within the encapsulation header can be used to indicate that the packet header contains a service path descriptor. This may be in the form of a flag or other such parameters.

In some embodiments, if the destination address field does not include the service path descriptor and instead includes a network destination address, the method includes forwarding 380 the packet toward a destination indicated by the network destination address, without processing the packet according to processing along the service function path.

In some embodiments, processing and forwarding of the packet includes processing 365 the packet according to a service function associated with the network node device. Processing of a packet can include replacing, changing or modifying a portion of the packet, such as its header and/or payload, in accordance with a predetermined data processing routine, for example in order to implement a type of service function as mentioned above. Processing of a packet can include using part or all of a packet payload as input to a predetermined data processing operation. Processing of a packet can include one or more of: inspection of the packet, discarding the packet (e.g. after inspection), performing an ancillary function based on inspection (e.g. updating a counter), modifying, replacing, or removing elements (e.g. fields in the packet or portions of the payload) within the packet, and adding elements to the packet. AN example of an element is a tracking object embedded in an HTML page or an HTTP header. In some embodiments, processing the packet may be omitted. In some embodiments, processing and forwarding of the packet includes replacing/changing 370 the address value in the destination address field in the header to indicate a next service function in the service function path which is to receive the packet. In some embodiments, processing and forwarding of the packet includes forwarding 375 the packet along the service function path and/or towards the next service function.

For purposes of clarity, various embodiments of the invention are described herein, in which an IP protocol, such as an IPv4 or IPv6 protocol is used for forwarding packets along the service function path. However, in other embodiments, the IP packet (e.g. the IP transport tunnel packet) inside the service domain and traversing the service function path may be replaced by a packet according to another protocol. In particular, the IP packet traversing the service function path may be replaced with another type of packet such as an Ethernet frame with locally administered Ethernet addresses. As such, an outer Ethernet frame can be used as an outer packet encapsulating an inner IP packet (or inner Ethernet frame.)

Embodiments of the present invention perform service function forwarding using conventional packet forwarding mechanisms. Service function forwarding can be enabled using data carried within a conventional (outer) IP header, in particular within the destination address field thereof. Embodiments of the present invention forward packets with a service function header and packets without a service function header through a common set of (virtual) links and routers. It should be understood that in some embodiments, in place of a physical router, a routing function may be employed. Such routing functions may be implemented as virtualized entities within the network. Embodiments of the present invention can transmit metadata context information associated with a service function along with the data packets. In one such embodiment, the context information can be encoded and placed into a source address field in an outer header of an encapsulated packet. Embodiments of the present invention may provide for efficiencies in overheads for service function context encapsulation. Embodiments of the present invention may use distributed routing protocols together with conventional routers. Other embodiments of the present invention may use centralized path computation nodes that provide forwarding instructions to the packet forwarding nodes. Those skilled in the art will appreciate that a path computation engine can generate forwarding instructions that can be transmitted to the packet forwarding nodes. This transmission may take place in a control plane, logically separate from the data plane over which packets are forwarded. Upon receipt of forwarding instructions from a path computation engine, a packet forwarding node, such as an SFF, can store these instructions, for example, in a routing table. Embodiments of the present invention may apply advanced routing mechanisms (e.g. route aggregation, load balancing, equal cost multipath routing, and fast path restoration) to service function paths.

By incorporating service function header information into a transport tunnel header, such as an IP tunnel header, various benefits may potentially be achieved by embodiments of the present invention. For example, in some embodiments, rather than using specialized equipment, commercial off-the-shelf routers and/or switches can be used in the network, obviating the need for specialized routing protocols and packet forwarding engines. In some embodiments, conventional forwarding mechanisms (e.g. longest prefix match) may be used to: forward a flow through a pre-defined service function path; aggregate forwarding table entries to handle multiple SFPs; and/or apply advanced routing mechanisms (e.g. shortest path selection, least cost path selection, equal cost multipath).

According to embodiments of the present invention, existing mechanisms can be used for interworking with lower layer protocols, especially in data centre deployments. Virtual Local Area Networks (VLANs) can be used for such interworking.

Embodiments of the present invention provide for a method and apparatus for forwarding a packet along a service function path through a network, in which network service information (such as service context data or metadata context information) is incorporated into a network address of the packet header, in particular within the source address field thereof.

Embodiments of the present invention provide for a method and apparatus for service function chaining in which the destination network address includes a service function path identifier and a service function identifier.

Embodiments of the present invention provide for a method and apparatus for conveying service context metadata along a service function path through a network, in which service context metadata is incorporated into the source network address of a packet header, such as the encapsulation packet header.

Embodiments of the present invention provide for a method and apparatus for computing a network address to be used as the destination address for forwarding a packet to the next service function along the service function path.

Figure 4:
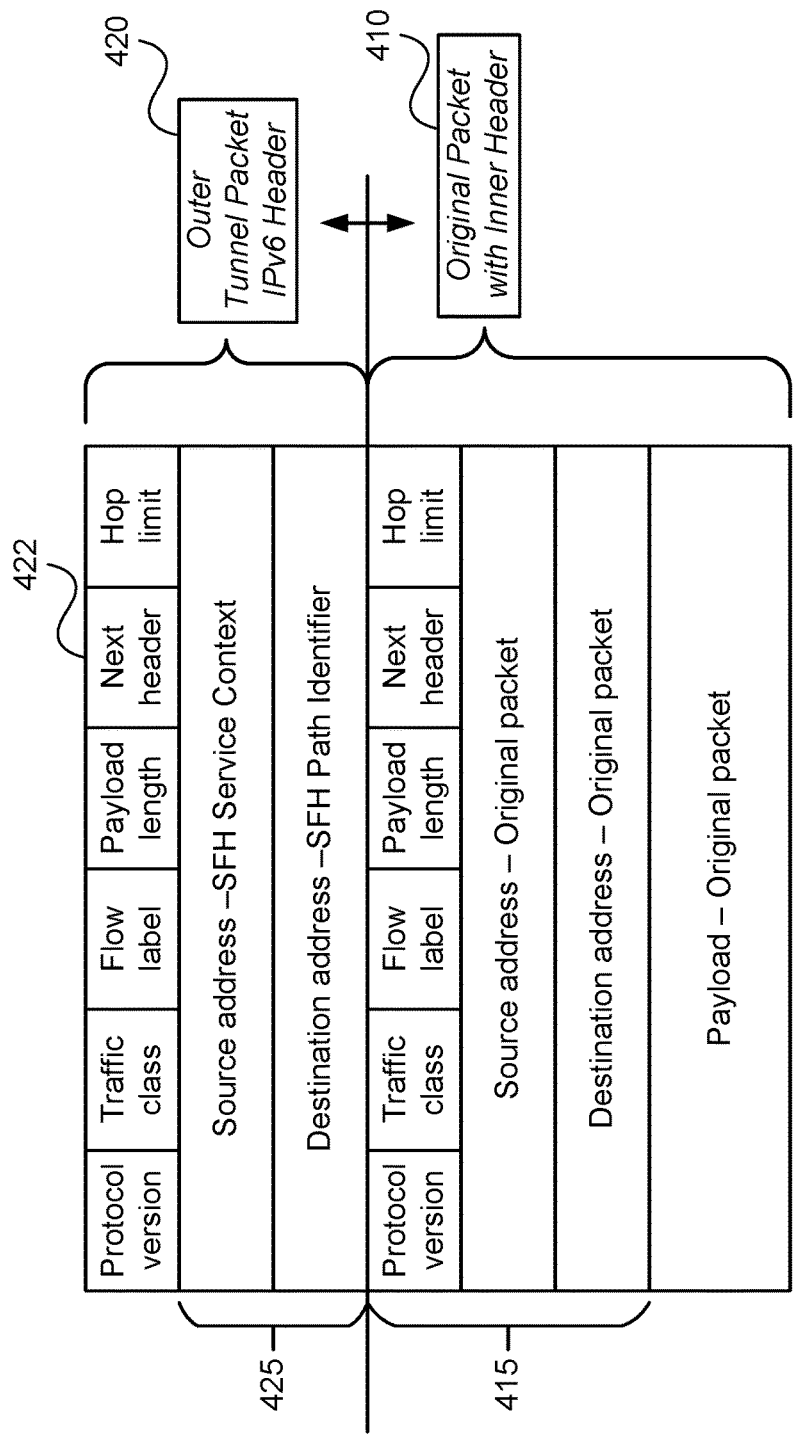
FIG. 4 illustrates encapsulation of an original data packet inside an IP tunnel packet, according to an embodiment of the present invention.

According to embodiments of the present invention, and with reference to FIG. 4, an original data packet 410, including its header 415 and its payload, is encapsulated inside an IP transport tunnel packet. In an exemplary embodiment utilizing IPv6, the encapsulation process comprises adding an outer IPv6 header 420 to the original IP data packet 410. The outer IPv6 header 420 includes source and destination network address fields 425. These network address fields 425 can be used to house a service function header (SFH). The IPv6-based service function header is added at the ingress to the SFP and is removed at the egress of the SFP. Because the outer header 420 is removed at the egress of the service domain (e.g. at the last node or function in the SFP), the SFH is not transmitted outside the service domain, and thus may not be used for packet forwarding outside of the service domain. Those skilled in the art will appreciate that in some embodiments, the SFH 425 typically provides both a service context that is encoded so that it can be carried in the source address field of the encapsulation header 420, and an SFP that can be encoded as the destination address of the encapsulation header 420. Those skilled in the art will appreciate that the use of the source address field for holding the service context and the destination address field for identifying the SFP, is a mapping that is used in one embodiment of the present invention. In other embodiments, the source address could define the SFP (and the destination address could be used for the context information), but all nodes within the service domain would then need to determine routing information using the source address. This would make carrying non-service chain traffic more difficult. Similarly, each of the service context and SFP could be encoded across the source and destination address fields (or at least one of them could be encoded across both address fields), with the requisite need for each node in the service domain to identify packets as being subject to a SFC and for those identified packets compute a forwarding path.

In some embodiments, the existing "Next Header" field in a standard IPv6 packet header or the existing "Protocol" field in a standard IPv4 packet header is exploited to realise additional functionality. For the IPv6 encapsulation shown in FIG. 4, the Next Header field 422 in the outer SFH tunnel packet may be set to the value "IPv6 (41)", in accordance with the convention as specified by the Internet Assigned Numbers Authority (IANA). If the encapsulated data packet is an IPv4 packet, the Next Header or Protocol field in the outer SFH tunnel packet may be set to the value "IPv4 (4)"; similarly, if the encapsulated data packet is an Ethernet frame, the Next Header or Protocol field in the outer SFH tunnel packet may be set to the value "EtherIP (97)".

In some embodiments, if a particular service requires additional service context metadata in order to process a packet, this information may be included as an IP extension header as extended SFH context information. The additional service context metadata may, for example, be encoded within the extension header using the conventional Type-Length-Value (TLV) structure. In this case, the Next Header or Protocol field in the outer SFH tunnel packet can be set to a particular value, such as a value to be determined by the IANA in a future standardization exercise.

Figure 5:
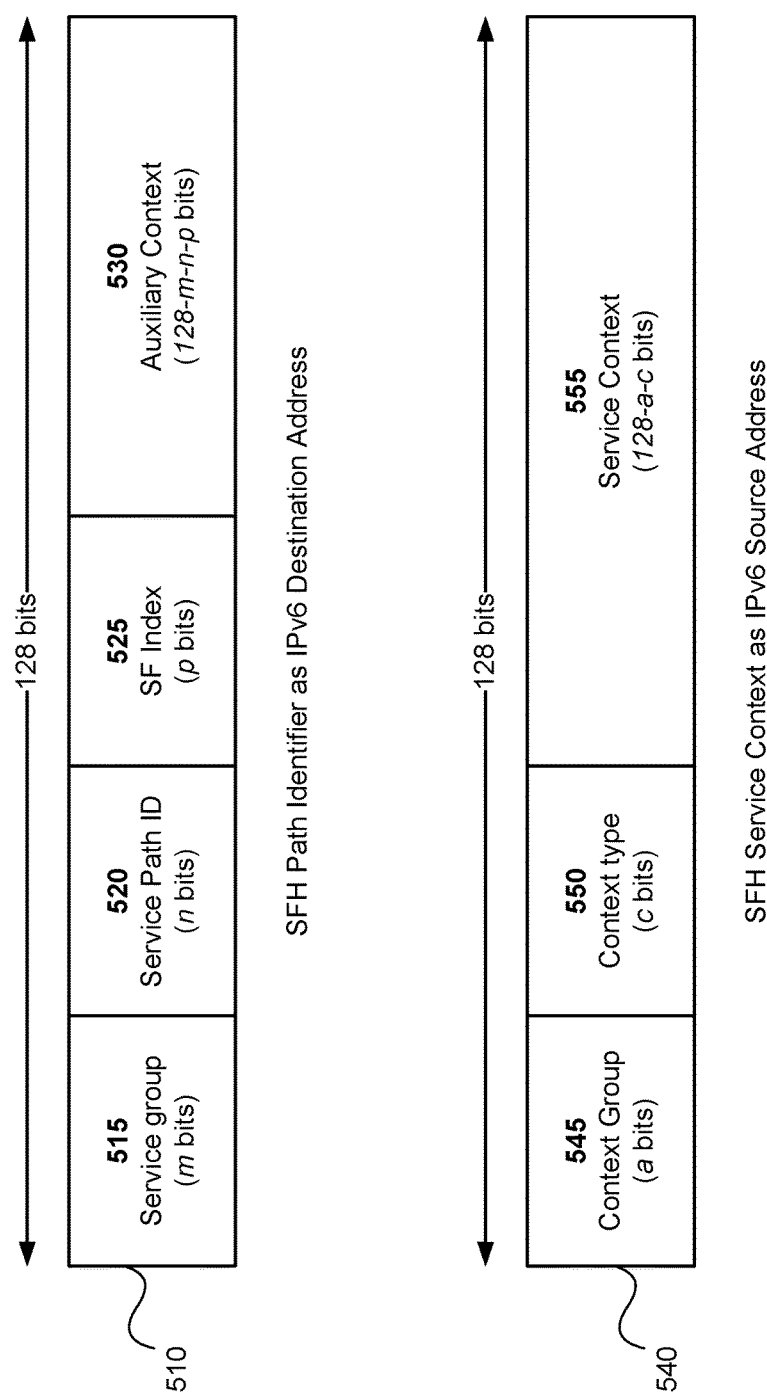
FIG. 5 illustrates an example of a destination address field and a source address field in an outer IPv6 header being used to encode information such as a service function path identifier and associated context metadata, according to an embodiment of the present invention.

FIG. 5 illustrates an example of a destination address field 510 and a source address field 540 in an outer IPv6 transport tunnel packet header being used to encode information such as a service function path identifier and associated context metadata, according to an embodiment of the present invention. As will be understood, in combination, the destination address field 510 and the source address field 540 form the service function header 425. The destination address field of the outer IPv6 header is used to convey a service function header (SFH) path identifier to denote the service path. The SFH path identifier may include an m-bit service group 515, an n-bit service path identifier 520, a p-bit service function (SF) index 525, and optional auxiliary context 530. The service group and the service path identifier are collectively referred to herein as the service path descriptor. The source address field of the outer IPv6 header may be used to convey a SFH service context. The SFH service context may include an a-bit context group 545, a c-bit context type 550, and a service context 555. At least some of the above data can be omitted or are optional. For example, context data such as the auxiliary context and/or information contained in the source address field may be omitted when unnecessary. When omitted, the corresponding field in the service function header may be set to a pre-defined value (e.g. all zeros).

The service group 515 may be used, for example, to identify the address as an SFH in order to distinguish it from conventional IPv6 subnet addresses. Routers at the border of the service domain may be configured to prevent packets with SFH addresses from being forwarded outside of the service domain (e.g. into connected data networks such as the Internet). Those skilled in the art will appreciate that nodes not at the border may also be so programmed, but such instructions would be ignored for any packet being sent to another node in the domain. The service group field may additionally or alternatively be used to distinguish the SFP identifier used within different domains of the network. The service group field may additionally or alternatively be used to identify a network slice, for example as set forth in the NGMN Alliance document entitled "Description of Network Slicing Concept", January 2016. The service group field may additionally or alternatively be used to distinguish between the forward and reverse paths of an SFP.

In various embodiments, a service node (SN), on behalf of its hosted service functions, is configured to forward packets according to the present invention if a portion of the packet header, such as the destination address field, contains an indication that the packet is being forwarded along a service function path. The indication may be the service group 515 as discussed above. Otherwise, the packet may be forwarded according to standard IP operation. As such, different processing may be applied to the packet depending on header information contained in the packet's destination address field. For an incoming SFH-encapsulated packet, the service node may be configured to remove the transport tunnel packet header 420 before forwarding the original data packet 410 to a service function. For an outgoing SFH-encapsulated packet, the destination address can be updated to direct the packet to the next service function to process the packet. The processing applied by a service node to an SFH-encapsulated outgoing packet is subsequently described herein. Packets that do not include a SFH can be processed by the service node using any number of different mechanisms including the use of conventional IP operations. Those skilled in the art will appreciate that if other mechanisms are used that modify the source and destination addresses of encapsulation headers, the packets (or packet flows) that are not using SFH encapsulation can be processed using the other mechanisms. Accordingly, the presented discussion has been largely directed towards the identification of SFH encapsulated packets and the processing of these packets, and not the manner in which non-SFH encapsulated packets are processed should they be identified.

The SFP identifier 520 denotes the service function path (or alternately the Service Path) to be followed by the encapsulated packet. In some embodiments, the service group 515 and the SFP identifier 520 may be combined and treated as a single (m+n) bit service path descriptor. One skilled in the art will appreciate that a tandem node (e.g. an SFF) may be able to identify a particular service function path by reading the service path ID 520 and using the n bit value as an index with which to perform a lookup in a lookup table. The lookup table may provide a mapping between the service path ID 520 and a set of service paths, in which case the lookup table could be the same at all tandem nodes, and each tandem node would then be able to map the service path to either an SN or another SFF. The mapping of the service path to an SN or another SFF can be done in accordance with the SF index 525.

The SF index 525 identifies the next service function along the SFP. It can be initialised at the ingress to the SFP. The SF Index 525 can be updated at each SF (or by the service node hosting the SF) before the packet is forwarded to the next SF in the SFP. Multiple instances of a particular service function may be active within the service domain. In some embodiments, a service function (or its associated service node) may participate in the routing protocols of the service domain to announce reachability to one or more SFPs and associated SF Index. IP routing and forwarding functions (RFFs) receiving this routing information may take this into account (e.g. in the computation of a shortest path) when determining how to forward an SFH-encapsulated packet. Examples of such procedures are described below.

The auxiliary context 530 field can be used to contain context information that may be used by service functions and/or service function forwarders along the SFP to handle this packet. In some embodiments, the auxiliary context field may contain a correlation identifier or a hash value computed over one or more fields of the encapsulated packet to facilitate steering a SFH-encapsulated packet to an appropriate instance of a SF. In some embodiments, the auxiliary context may include an extension of the service context as described elsewhere herein, or it may be independent of the service context. In other embodiments, the SFH path identifier may not include an auxiliary context.

In some embodiments, the routing prefix (RP) used by a router to determine the next hop comprises the service group, SFP identifier and SF index; optionally, some elements of the auxiliary context may also be included in the RP.

Because the SFH transport tunnel packet is typically only used for unidirectional forwarding along an SFP, the source address that would typically appear in an IP packet header may not be required. As such, in the outer transport tunnel packet header, the source address field 540 may be used instead to house service context metadata related to this particular packet or its flow. Because the source address field 540 houses the service context metadata, as the packet is moved through the service domain, the service context metadata is carried along with it.

The context group 545 may be used, along with the optional context type field 550, to indicate the structure and contents of the following service context.

The context type 550 may be used to identify the content and/or the sub-fields that may be present in the service context.

The service context 555 contains information that may be used by the service functions to process the encapsulated packet. In some instances, the service context may be augmented by information contained in the auxiliary context field 530 as described elsewhere herein. A non-exhaustive list of examples of service context include: a subscriber identifier, an account identifier, an end station identifier, a service tag, an application identifier, Quality of Service (QoS) information, flow classification information, policy enforcement information, etc.

In various embodiments, the context group 545 and, optionally, the context type 550 are well-known values that can be successfully authenticated by any router along the SFP that performs ingress filtering, for example as specified in IETF RFC 2827, "Network Ingress Filtering: Defeating Denial of Service Attacks which employ IP Source Address Spoofing", May 2000, available via https://tools.ietf.org.

In some embodiments (e.g. in service domains where ingress filtering is not employed), the context group and the context type fields may be included in the auxiliary context field. In this case, the SFH service context (which is mapped onto the IP source address field) may only include the service context. In other embodiments, the context group 545 and the context type 550 fields may not be required. In this case, the SFH service context field 555 and, optionally, the auxiliary context field 530 consists essentially of only the service context.

Figure 6:
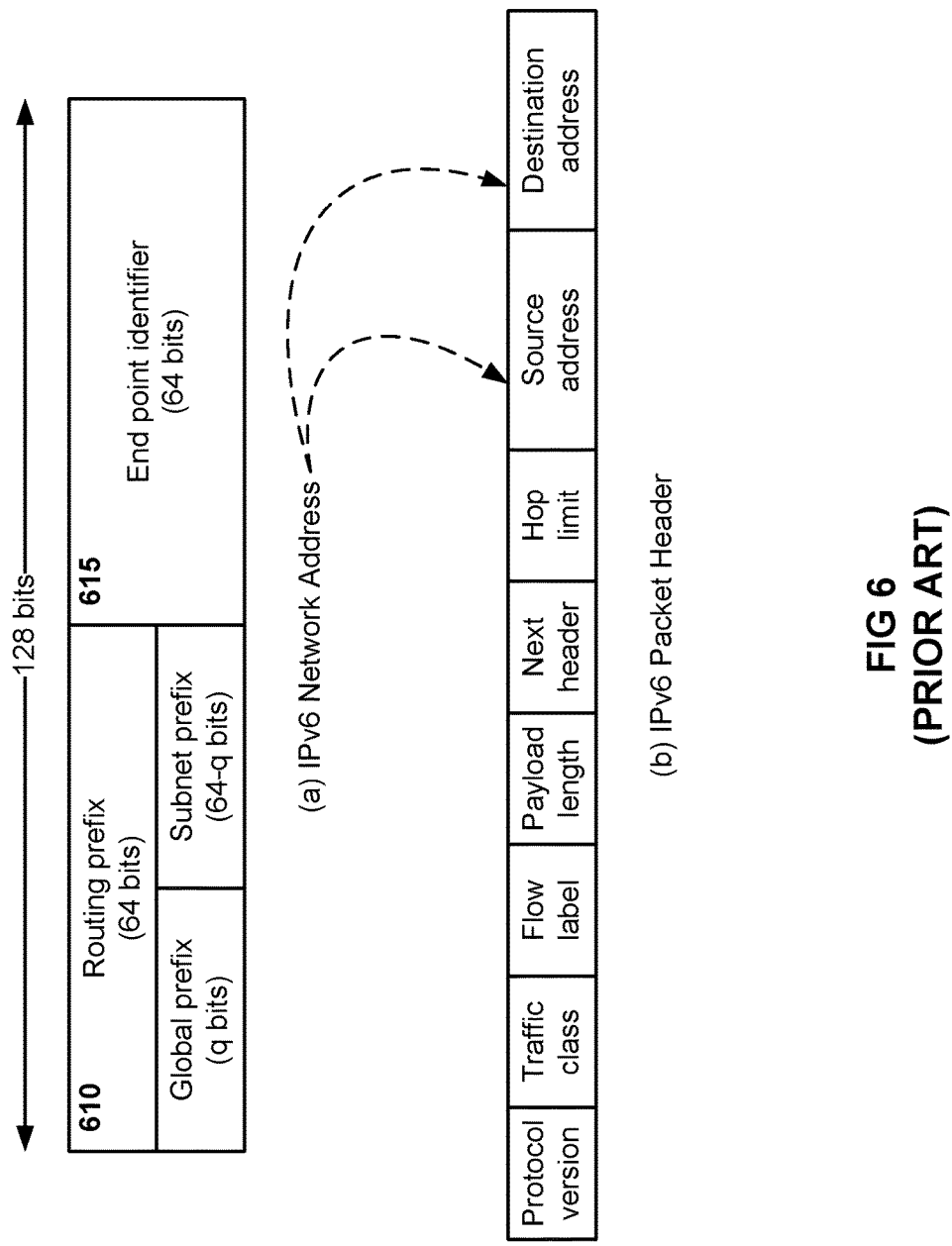
FIG. 6 illustrates a prior art IPv6 packet header.

The structures illustrated in FIG. 5 can be compared with the structures of the source address and destination address fields of a prior art IPv6 packet header as follows. The prior art IPv6 packet header is illustrated in FIG. 6, in which each of the source address and destination address fields include: a 64-bit routing prefix 610 having a q-bit global prefix part and a (64-q)-bit subnet prefix part; and a 64-bit end point identifier 615. In one example embodiment, m+n+p=a+c=64. However, other embodiments are also possible.

Although in FIG. 5 the destination address field 510 holds the service function path identifier and the source address field 540 holds the context information, in other embodiments the service function path identifier and/or the context information can be held in either or both of the source address field and the destination address field. Further, in some embodiments, the lengths of the service function path identifier and/or the context information can be varied, for example shortened. Those skilled in the art will appreciate that where the SFH path identifier 510 and the SFH service context 540 are identified in FIG. 5 as being 128 bits in length, this specification is based on the embodiment in which the encapsulation header makes use of IPv6 which uses 128 bit address fields. If the outer layer encapsulation makes use of a different protocol, different lengths may be used.

In some embodiments, the SFH service context in the outer packet header may contain path-invariant context metadata that cannot (or should not) be modified as a packet is forwarded along the SFP. An SFH context extension header may contain context metadata that may be modified by SFs and/or SNs along the SFP.

In some embodiments, multiple SFH context extension headers may be added to a packet by SFs and/or SNs as it is forwarded along the SFP. The additional context metadata may, for example, provide the results of processing by a SF that may be used by a subsequent SF.

In some embodiments, packet forwarding using a SFH such as that illustrated in FIG. 5 can be performed using conventional mechanisms such as those employed by many conventional routers—i.e. bits of the Routing Prefix are matched to an entry in the router's forwarding information base (FIB) and then forwarded to the next hop through the corresponding (virtual) link. The contents of the FIB may be populated using, for example, a conventional distributed routing protocol, such as the Open Shortest Path First (OSPF) protocol, or using a centralised management entity (e.g. a software defined networking (SDN) controller).

In some situations, the service function path may be dynamically determined by an ingress node which can then construct a (partial) list of the service path segments to be traversed. For example, a segment routing extension header or a source routing extension header may be inserted after the outer SFH packet header to contain the list of path segments to be followed by the packets in the flow. Segment routing extensions may be, for example, compliant with those defined in the draft IETF RFC document entitled "IPv6 Segment Routing Header (SRH)" (draft-ietf-6man-segment-routing-header) available via https://tools.ietf.org. The addresses contained in the SRH may be conventional IP addresses, SFH addresses, or a mixture of both. In this case, the Next Header or Protocol field in the outer SFH tunnel packet may be set to the value defined by the above-mentioned draft IETF RFC document "IPv6 Segment Routing Header (SRH)."

In one particular embodiment, one or more entries in the segment or source routing extension may define a SFP through a Radio Access Network (RAN) segment of a mobile network while further entries define an SFP through a corresponding Core Network (CN). In some embodiments, the RAN and CN are networking domains under the same Mobile Network Operator (MNO).

Detailed procedures carried out in accordance with embodiments of the present invention will now be described.

In some embodiments, a centralized entity (e.g. a software defined networking (SDN) controller) may be provided and configured to strictly control the forwarding of SFH-encapsulated packets by pre-computing Forwarding Information Base (FIB) entries for all IP routing and forwarding functions and by configuring SNs and/or SFs with the identity of the next service function in the SFP. Any change in the service function path or in the number or sequence of service functions along the SFP results in new computations by the centralized entity and appropriate reconfiguration of the RFFs, SNs and/or SFs.

In some embodiments, forwarding of packets along a service function path may be determined in a distributed fashion using, for example, conventional distributed routing protocols (e.g. OSPF or Intermediate System to Intermediate System (IS-IS) routing). Various procedures are described below for SFP forwarding based on the use of distributed routing mechanisms when combined with the IPv6-based service function header (SFH) illustrated in FIG. 5. These procedures may be combined with other conventional packet forwarding mechanisms (e.g. equal cost multipath selection, load balancing, source routing, and fast path restoration) to provide more flexible and resilient networks.

Figure 7A:
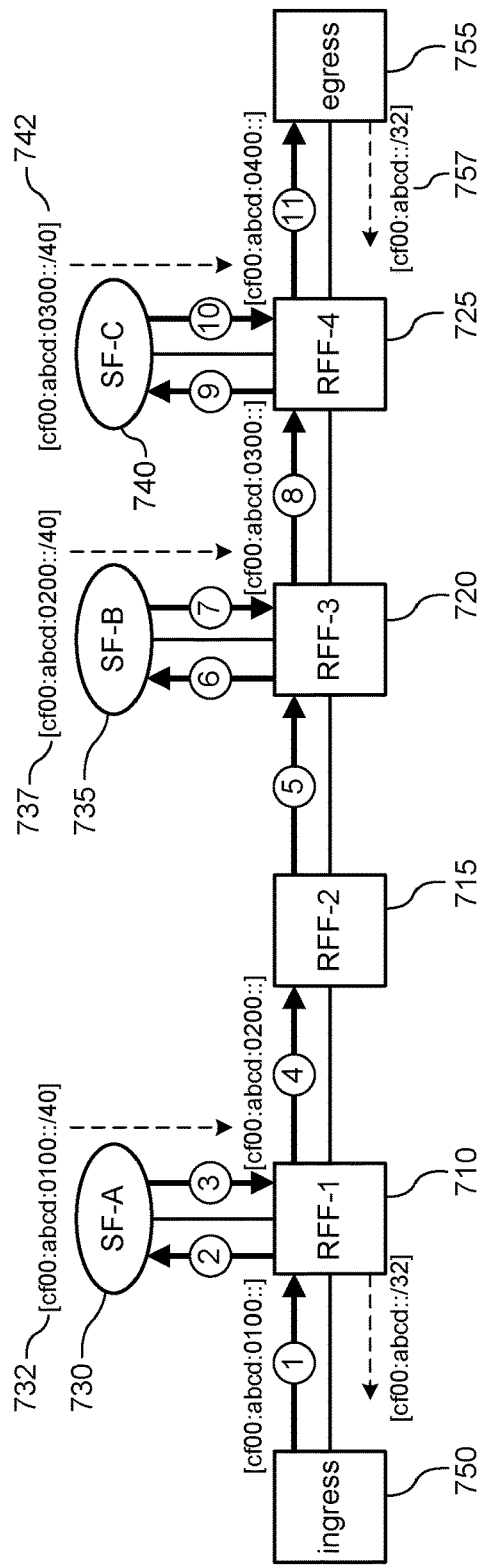
FIG. 7A illustrates a service function path, according to an embodiment of the present invention.

FIG. 7A illustrates an example service function path comprising four conventional IP routing and forwarding functions (RFF 1 710, RFF 2 715, RFF 3 720 and RFF 4 725) and three service functions (SF A 730, SF B 735 and SF C 740). For clarity, the service nodes (SN) that may be housing the service functions are not shown. The RFFs may be dedicated to forwarding SFH-encapsulated packets or may forward both SFH and non-SFH packets. A RFF may operate at least partially as a SFF. More than one ingress node 750 and/or egress node 755 may exist within the service domain for this SFP. Between each RFF and between each RFF and SF there may be additional IP RFFs that are not shown.

In this example, the service group is assigned the IPv6 subnet address [cf00::] to distinguish packet flows in an SFP from regular IPv6 packets (i.e. without SFH encapsulation) that may be forwarded over the same links. The service path identifier in this example is [cf00:abcd::]. (As will be readily understood by a worker skilled in the art, the text representation of IPv6 addresses as described herein follows convention in which addresses are expressed in hexadecimal format, groups of 16 bits are separated by a colon (:) for readability, a double colon (::) indicates the remaining bits of the address are zero (0), and a prefix of length k (/k) matches the k most significant bits of an address. A subnet mask is a bit string that has '1' bits in the k most significant bits of the string and '0' bits elsewhere.)

Using a conventional distributed routing protocol such as OSPF, one or more of the egress points 755 of the SFP within this service domain identifies itself as the destination for all IPv6 addresses associated with this path by advertising the prefix designation [cf00:abcd::/32] 757.

Each service function (or its service node) can be assigned a subnet—a contiguous subset of IPv6 addresses—from the block of addresses associated with the service path identifier. In the present illustrated embodiment, the IPv6 address representing the subnet assigned to a SF at position n in the service function chain must be less than the IPv6 address representing the subnet assigned to a SF at position n+1 in the SFC. In the example of FIG. 7A, SF A 730 (at the first position in the SFC) is assigned the subnet [cf00:abcd:0100::/40] 732, SF-B 735 is assigned the subnet [cf00:abcd:0200::/40] 737, and SF-C 740 is assigned the subnet [cf00:abcd:0300::/40] 742. These values are examples.

Using the routing protocol of the service domain, such as the OSPF protocol, each SF (or its SN) advertises its assigned subnet; these advertisements are then propagated to all of the RFFs in the service domain. In some embodiments, more than one instance of a SF (or their SNs) may advertise reachability to the same subnet thereby indicating that any such instance of the SF can perform the associated service function. Thus a RFF may forward a packet to any such instance of the SF using conventional routing mechanisms such a least cost routing, load balancing and/or equal cost multipath. In some embodiments, a SF (or its SN) may advertise reachability to more than one subnet thereby indicating that the SF can appear in more than one SFP. Forwarding of a packet along the SFP then proceeds as follows.

When a packet is received at one of the ingress nodes 750, it is classified and a policy decision is made to process the packet according to the service function chain represented in this example by SFP [cf00:abcd::]. The ingress node may be associated with an internal or external classifier configured for this purpose. The ingress node encapsulates the packet inside an IPv6 transport tunnel packet and sets the destination address in the SFH packet header to the value assigned to the first SF in the SFC—i.e. to the subnet address 732 assigned to SF A [cf00:abcd:0100::]—and forwards the packet towards SF A at the operation marked 1 in FIG. 7A.

Based on routing advertisements propagated by RFF 1 710, the SFH-encapsulated packet is received by RFF 1 and RFF 1 subsequently matches the destination address in the SFH to the subnet 732 advertised by SF A. RFF 1 then forwards the SFH-encapsulated packet towards SF A 730 at the operation marked 2 in FIG. 7A. In some embodiments, SF A may be the only instance of the service function advertising reachability to subnet [cf00:abcd:0100::/40]. In other embodiments, SF A may be the instance chosen by RFF 1 710 (based, for example, on least cost routing) from one of several instances of the service function advertising reachability to subnet [cf00:abcd:0100::/40] 732.

Once SF A 730 has finished processing the encapsulated packet, SF A (or its SN) creates a new destination address to insert into the SFH of the transport tunnel packet. Only information known locally to SF A is required to create the new destination address—i.e. SF A does not need to know the identity of other SFs in the SFP or the subnet addresses that have been assigned to those SFs.

Figure 8:
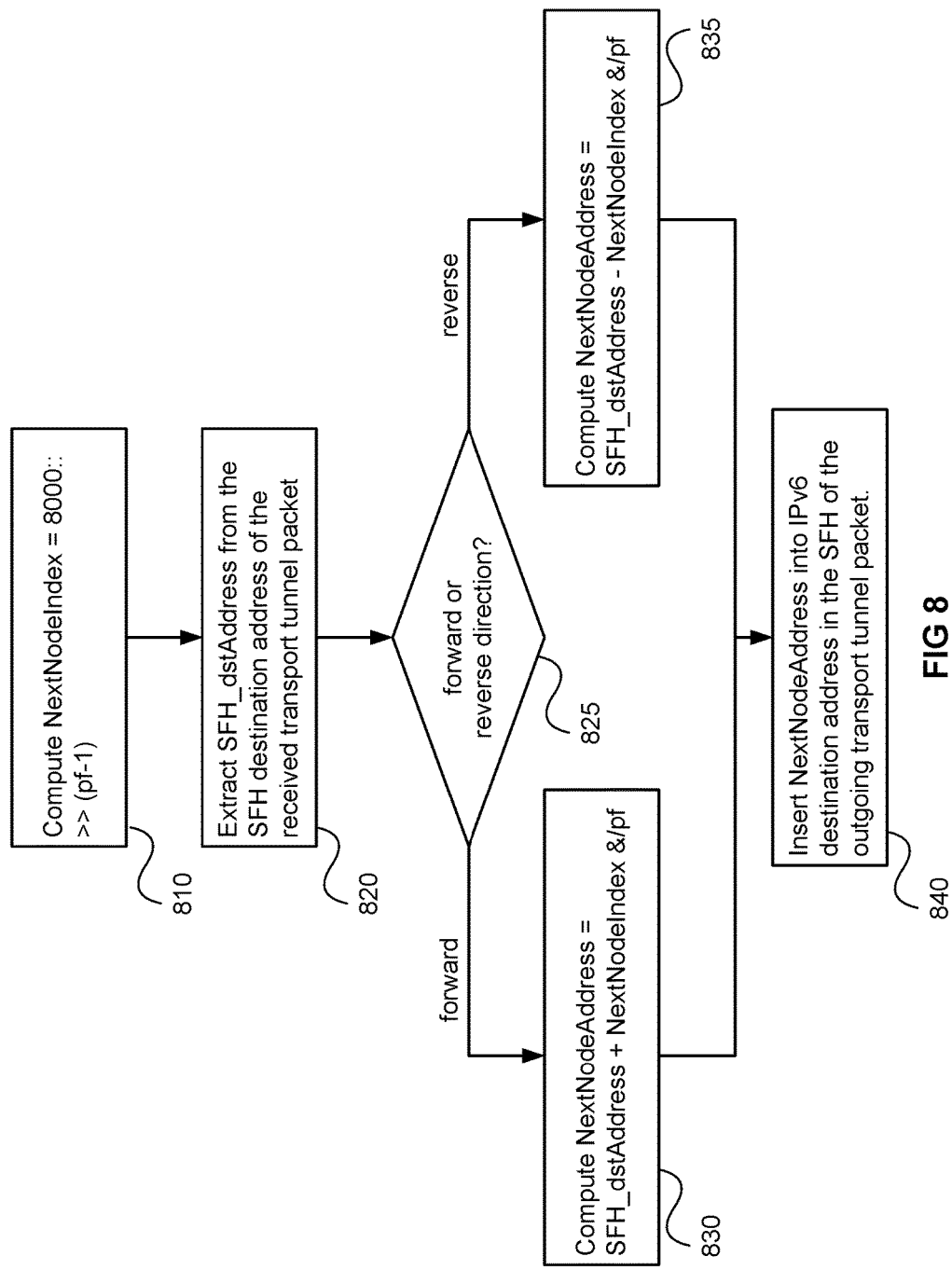
FIG. 8 illustrates construction of a new destination address for a tunnel packet being forwarded along a service function path, according to an embodiment of the present invention.

The new destination address is created as follows, with reference to FIG. 8. In one embodiment, a NextNodeIndex=8000::>>(pf−1) is first determined (computed) 810, where pf is the prefix length assigned to SF A and >> is the right bit shift operator. In another embodiment, the value of NextNodeIndex may be preconfigured into SF A. Next, the SFH_dstAddress is extracted 820 from the destination address of the received SFH. This may comprise obtaining the SFH_dstAddress as the IPv6 destination address in the SFH of the received transport tunnel packet. Next, it is determined 825 whether the packet is being transmitted in the forward or reverse direction along the SFP as determined by a corresponding value in the service group field. If the packet is being transmitted in the forward direction of the SFP, then the NextNodeAddress is computed 830 via the computation NextNodeAddress=SFH_dstAddress+NextNodeIndex &/pf where &/pf is a logical AND operation applied to the routing prefix (service group, SFP identifier and SF index) using a subnet mask of pf bits. If the packet is being transmitted in the reverse direction of the SFP then the NextNodeAddress is computed 835 via the computation NextNodeAddress=SFH_dstAddress−NextNodeIndex &/pf. Next, the IPv6 destination address in the SFH of the transport tunnel packet is modified by inserting 840 the computed value NextNodeAddress therein.

At SF A in this example: NextNodeIndex=8000::>>(40−1)=0000:0000:0100:: and NextNodeAddress=cf00:abcd:100::+0000:0000:0100:: &/40=cf00:abcd:0200::. SF A 730 then forwards the packet towards the next SF in the service domain at the operation marked 3 in FIG. 7A. In the example of FIG. 7A the packet is shown as forwarded through RFF 1 710, however in other embodiments the packet is not forwarded through RFF 1. Because the packet will be forwarded using conventional IP routing mechanisms, the forwarded packet at the operation marked 3 may or may not pass through RFF 1.

Based on received routing advertisements, RFF 1 710 forwards the SFH-encapsulated packet towards RFF 2 715 at the operation marked 4 in FIG. 7A.

Based on received routing advertisements, RFF 2 715 forwards the SFH-encapsulated packet towards RFF 3 720 at the operation marked 5 in FIG. 7A.

When the SFH-encapsulated packet is received by RFF 3 720, it analyzes the destination address in the SFH, in this case by matching the destination address to the subnet 737 advertised by SF B 735 (or its SN). RFF 3 720 then forwards the SFH-encapsulated packet towards SF B 735 at the operation marked 6 in FIG. 7A.

Once SF B 735 has finished processing the encapsulated packet, SF B (or its SN) creates a new destination address to insert into the SFH of the transport tunnel packet. The new destination address is created as follows: NextNodeIndex=8000::>>(40−1)=0000:0000:0100:: and NextNodeAddress=cf00:abcd:0200::+0000:0000:0100:: &/40=cf00:abcd:0300::. SF B then inserts NextNodeAddress into the IPv6 destination address of the SFH of the transport tunnel packet and then forwards the packet towards the next SF in the service domain at the operation marked 7 in FIG. 7A.

Based on received routing advertisements, RFF 3 720 forwards the SFH-encapsulated packet towards RFF 4 725 at the operation marked 8 in FIG. 7A.

When the SFH-encapsulated packet is received by RFF 4 725, it matches the destination address in the SFH to the subnet 742 advertised by SF C 740 (or its SN). RFF 4 725 then forwards the SFH-encapsulated packet towards SF C 740 at the operation marked 9 in FIG. 7A.

Once SF C 740 has finished processing the encapsulated packet, SF C (or its SN) creates a new destination address to insert into the SFH of the transport tunnel packet. The new destination address is defined as follows: NextNodeIndex=8000::>>(40−1)=0000:0000:0100:: and NextNodeAddress=cf00:abcd:0300::+0000:0000:0100:: &/40=cf00:abcd:0400::.

SF C 740 inserts NextNodeAddress into the IPv6 destination address of the SFH of the transport tunnel packet and then forwards the packet towards the next SF in the service domain at the operation marked 10 in FIG. 7A.

There are no other SFs in this SFP therefore, based on received routing advertisements 757, RFF 4 725 forwards the SFH-encapsulated packet towards the egress 755 of the SFP at the operation marked 11 in FIG. 7A. The egress performs de-encapsulation and forwards the de-encapsulated inner packet towards the destination address of the decapsulated packet.

Figure 7B:
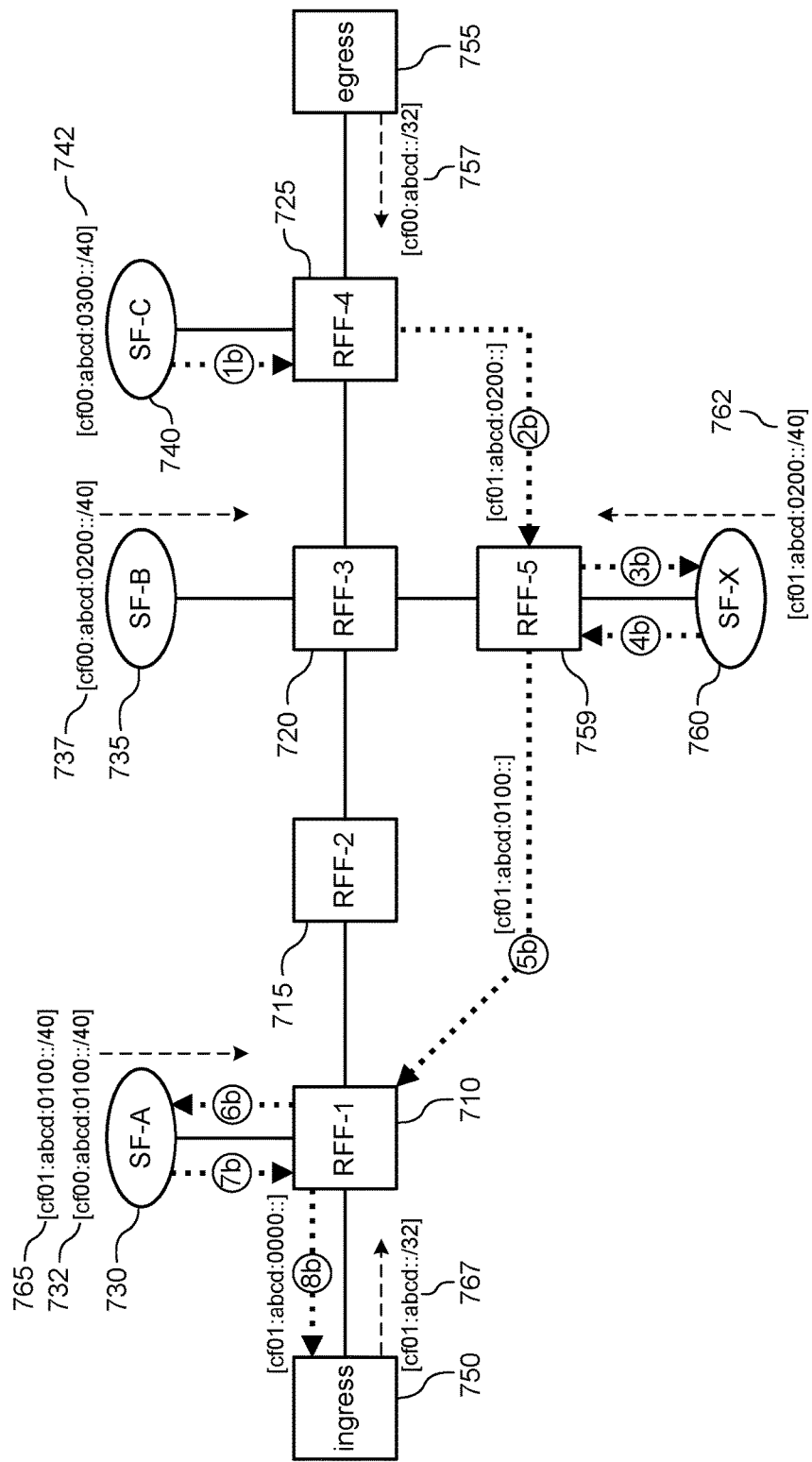
FIG. 7B illustrates a reverse service function path, according to an embodiment of the present invention.

FIG. 7B illustrates an example service function path with packet forwarding in the reverse direction. In this example, the service group for processing packets in the reverse direction is assigned the IPv6 subnet address [cf01::] to distinguish packet flows in the reverse direction of the SFP from packet flows in the forward direction of the SFP. Because routing advertisements for the reverse direction of a SFP are independent of the routing advertisements for the forward direction of the SFP, the SFs processing packets in the reverse direction may be the same or may be different from the SFs processing packets in the forward direction. Similarly, routing decisions made by RFFs in the reverse direction of the SFP (for least cost routing, load balancing, equal cost multipath, etc.) are independent of routing decisions made by RFFs in the forward direction of the SFP.

Using a conventional distributed routing protocol such as OSPF, one or more of the ingress points 750 of the SFP within this service domain identifies itself as the destination for all IPv6 addresses associated with the reverse direction of this path by advertising the prefix designation [cf01: abcd::/32] 767. SF A 730 is advertising the subnet [cf01: abcd:0100::/40] 765 for the reverse direction as well as subnet [cf00:abcd:0100::/40] 732 for the forward direction. SF X 760 only handles packets being transmitted in the reverse direction of the SFP and advertises the subnet [cf01:abcd:0200::/40] 762. SF B 735 does not handle packets being transmitted in the reverse direction of the SFP therefore it does not advertise any subnets for the service group of the reverse direction.

In the example of FIG. 7B, a packet that is being transmitted in the forward direction of the SFP [cf00:abcd::] is processed at SF C 740 where it is determined that information must be disseminated along the reverse direction of the SFP. SF C encapsulates this information inside an IPv6 transport tunnel packet and creates a new SFH for the transport tunnel packet. Only information available locally to SF C is required to create the destination address for the reverse direction in the SFH. SF C does not need to access the identity of other SFs in the SFP or the subnet addresses that have been assigned to those SFs.

The new destination address is created as follows with reference to FIG. 8. In one embodiment, first a NextNodeIndex=8000::>>(pf−1) is computed 810, where pf is the prefix length assigned to SF C and >> is the right bit shift operator. In another embodiment, the value of NextNodeIndex may be preconfigured into SF C. Next, the SFH_dstAddress is extracted 820 from the destination address of the SFH received in the forward direction of the SFP and change the service group of SFH_dstAddress to the service group of the reverse direction of the SFP. Next, because the packet is being transmitted in the reverse direction of the SFP, the NextNodeAddress is computed 835 via the computation: NextNodeAddress=SFH_dstAddress−NextNodeIndex &/40. Next, the computed NextNodeAddress is inserted 840 into the IPv6 destination address in the SFH of the transport tunnel packet. At SF C, the new destination address is created as follows: NextNodeIndex=8000::>>(40−1)=0000: 0000:0100:: and NextNodeAddress=cf01:abcd:0300::− 0000:0000:0100:: &/40=cf01:abcd:0200::.

SF C 740 modifies the IPv6 destination address of the SFH of the transport tunnel packet by inserting the computed value NextNodeAddress therein. SF C 740 then forwards the packet towards the next SF in the SFP at the operation marked 1b in FIG. 7B.

Based on received routing advertisements, RFF 4 725 forwards the SFH-encapsulated packet towards RFF 5 759 at the operation marked 2b in FIG. 7B.

When the SFH-encapsulated packet is received by RFF 5 759, it analyzes the destination address field in the SFH to match the content thereof to the subnet 762 advertised by SF X 760 (or its SN). RFF 5 then forwards the SFH-encapsulated packet towards SF X at the operation marked 3b in FIG. 7B.

Once SF X 760 has finished processing the encapsulated packet, SF X (or its SN) creates a new destination address to insert into the SFH of the transport tunnel packet. The new destination address is created as follows: NextNodeIndex=8000:: >>(40-1)=0000:0000:0100:: and NextNodeAddress=cf01:abcd:0200:: −0000:0000:0100::

&/40=cf00:abcd:0100::. SF X then modifies the value of the IPv6 destination address field of the SFH of the transport tunnel packet to insert the computed NextNodeAddress therein. SF X then forwards the packet towards the next SF in the SFP at the operation marked 4*b* in FIG. 7B.

Based on received routing advertisements, RFF 5 759 forwards the SFH-encapsulated packet towards RFF 1 710 at the operation marked 5*b* in FIG. 7B.

When the SFH-encapsulated packet is received by RFF 1 710, it analyzes the destination address field in the SFH to match the content thereof to the subnet 765 advertised by SF A 730 (or its SN). RFF 1 then forwards the SFH-encapsulated packet towards SF A at the operation marked 6*b* in FIG. 7B.

Once SF A 730 has finished processing the encapsulated packet, SF A (or its SN) creates a new destination address to insert into the SFH of the transport tunnel packet. The new destination address is created as follows: NextNodeIndex=8000:: >>(40−1)=0000:0000:0100:: and NextNodeAddress=cf01:abcd:0100:: −0000:0000:0100:: &/40=cf01:abcd:0000::.

SF A 730 modifies the value of the IPv6 destination address of the SFH of the transport tunnel packet to insert the computed NextNodeAddress therein. SF A 730 then forwards the packet towards the next SF in the SFP at the operation marked 7*b* in FIG. 7B.

There are no other SFs in the reverse direction of this SFP therefore, based on received routing advertisements 767, RFF 1 710 forwards the SFH-encapsulated packet towards the ingress 750 of the SFP at the operation marked 8*b* in FIG. 7B. The ingress then processes the received packet according to local policies which may include discarding all packets received in the reverse direction of an SFP.

Service function chains may be dynamic entities that, at various times, require service functions to be added to and/or removed from the SFC. The following sections describe how the sequence of service functions along a service function path may be modified without requiring reconfiguration of the entire SFP. This includes example procedures for dynamically modifying service function chains, according to embodiments of the present invention.

In order to add a service function to an SFP, the subnet assigned to the existing SF prior to the insertion point of the new SF is split, with a portion of the subnet assigned to the new SF and the remainder of the subnet assigned to the existing SF.

Figure 9:
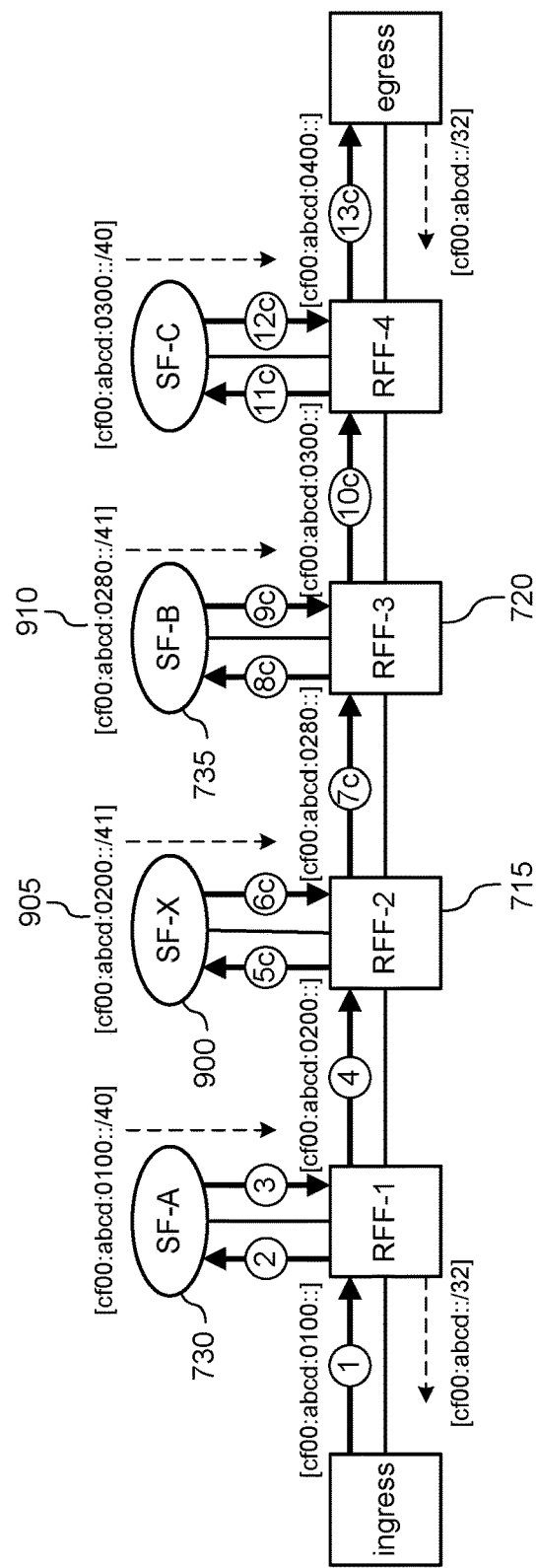
FIG. 9 illustrates insertion of a new service function into the service function path of FIG. 7A, according to an embodiment of the present invention.

Beginning from the service function path of FIG. 7A and with reference to FIG. 9, the present example assumes that a new service function SF-X 900 is being inserted into the service function path before SF B 735 resulting in the SFP of FIG. 9. The subnet currently assigned to SF B [cf00:abcd:0200::/40] is split into two smaller subnets with 910 [cf00:abcd:280::/41] assigned to SF B 735 and 905 [cf00:abcd:0200::/41] assigned to SF-X 900. Note that no other SFs are affected by this change.

Using the routing protocol of the service domain (e.g. OSPF), SF-A 730 and SF-X 900 (or their SNs) advertise the prefix of their newly-assigned subnets; these advertisements are then propagated to all of the RFFs in the service domain. Forwarding of a packet along the SFP then proceeds as follows:

Operations marked 1-4 in FIG. 9 proceed as described with respect to FIG. 7A.

When the SFH-encapsulated packet is received by RFF 2 715, it matches the destination address in the SFH to the subnet 905 advertised by SF X 900 (or its SN) using, for example, a longest prefix match. RFF 2 715 then forwards the SFH-encapsulated packet towards SF X at the operation marked 5*c* in FIG. 9.

Once SF X 900 has finished processing the encapsulated packet, SF X (or its SN) creates a new destination address to insert into the SFH of the transport tunnel packet (by modifying the destination address field thereof to include the new destination address). The new destination address is created as follows, using a prefix length (pf) of 41: NextNodeIndex=8000:: >>(41−1)=0000:0000:0080::; NextNodeAddress=cf00:abcd:0200:: +0000:0000:0080:: &/41=cf00:abcd:0280::; SF X then forwards the packet towards the next SF in the SFP at the operation marked 6*c* in FIG. 9.

Based on received routing advertisements, RFF 2 715 forwards the SFH-encapsulated packet towards RFF 3 720 at the operation marked 7*c* in FIG. 9.

When the SFH-encapsulated packet is received by RFF 3 720, it analyzes the destination address field in the SFH to match the value therein to the subnet 910 advertised by SF B 735 (or its SN) using, for example, a longest prefix match. RFF 3 720 then forwards the SFH-encapsulated packet to SF B 735 at the operation marked 8*c* in FIG. 9.

Once SF B 735 has finished processing the encapsulated packet, SF B (or its SN) creates a new destination address to insert into the SFH of the transport tunnel packet. The new destination address is created as follows, using a prefix length (pf) of 41: NextNodeIndex=8000:: >>(41−1)=0000:0000: 0080::; NextNodeAddress=cf00:abcd:0280:: +0000: 0000:0080:: &/41=cf00:abcd:0300::; SF B 735 then forwards the packet towards the next SF in the SFP at the operation marked 9*c* in FIG. 9.

Operations marked 10*c*-13*c* of FIG. 9 then proceed as described in operations marked 8-11 of FIG. 7A.

Removing a service function may be performed as follows. In order to remove a service function from an SFP, the subnet assigned to the SF being removed is merged with the subnet of a neighbouring SF.

Figure 10:
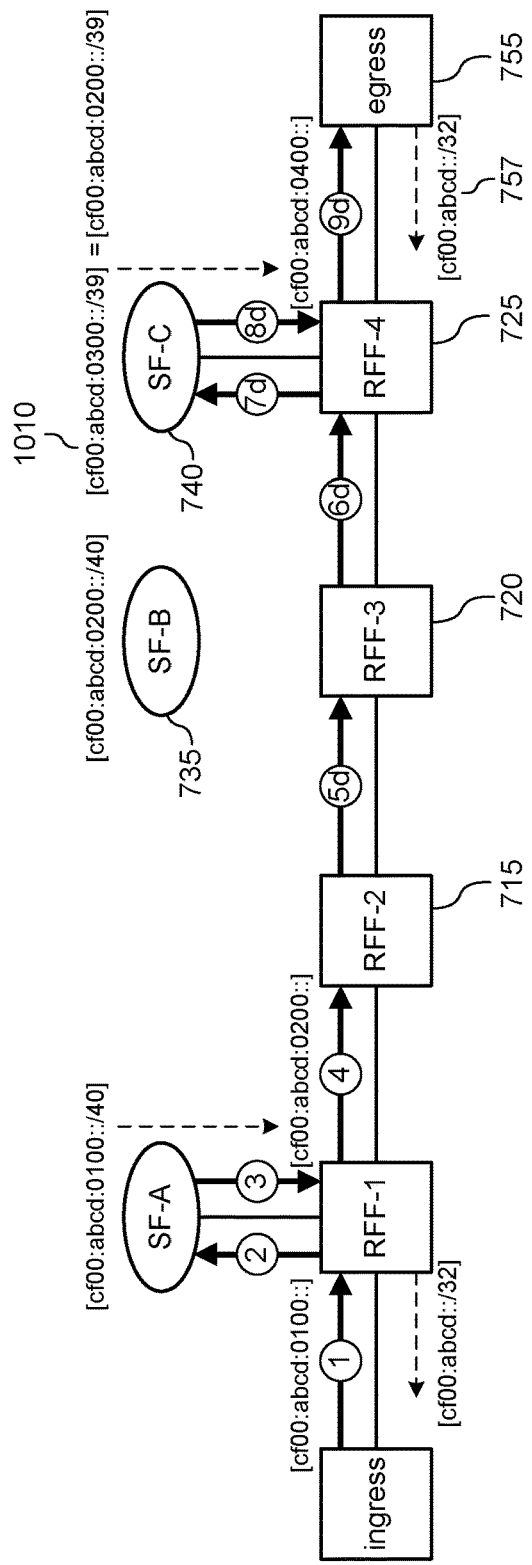
FIG. 10 illustrates removal of a service function from the service function path of FIG. 7A, according to an embodiment of the present invention.

Beginning from the service function path of FIG. 7A and with reference to FIG. 10, the present example assumes that service function SF B 735 is being removed from the service function path resulting in the SFP of FIG. 10. The subnet currently assigned to SF B [cf00:abcd:0200::/40] is merged with the subnet assigned to SF C 740, resulting in the assignment of 1010 subnet [cf00:abcd:0300::/39] to SF C which is equivalent to [cf00:abcd:0200::/39]. Note that no other SFs are affected by this change.

Using the routing protocol of the service domain (e.g. OSPF), SF C 740 (or its SN) advertises the prefix of its newly-assigned subnet; this advertisement is then propagated to all of the RFFs in the service domain. Forwarding of a packet along the SFP then proceeds as follows.

Operations marked 1-4 in FIG. 10 proceed as described in FIG. 7A.

Based on received routing advertisements, RFF 2 715 forwards the SFH-encapsulated packet towards RFF 3 720 at the operation marked 5*d* in FIG. 10.

Based on received routing advertisements, RFF 3 forwards the SFH-encapsulated packet towards RFF 4 725 at the operation marked 6*d* in FIG. 10.

When the SFH-encapsulated packet is received by RFF 4 725, it analyzes the destination address field in the SFH to match the destination address thereof to the subnet 1010 advertised by SF C 740 (or its SN). RFF 4 725 then forwards the SFH-encapsulated packet to SF C 740 at the operation marked 7*d* in FIG. 10.

Once SF C 740 has finished processing the encapsulated packet, SF C (or its SN) creates a new destination address to insert into the SFH of the transport tunnel packet. The new destination address is created as follows, using a prefix length (pf) of 39: NextNodeIndex=8000:: >>(39-1)=0000: 0000:0200::; NextNodeAddress=cf00:abcd:0200:: +0000: 0000:0200:: &/39=cf00:abcd:0400::; SF C then forwards the packet towards the next SF in the SFP at the operation marked 8d in FIG. 10.

Based on received routing advertisements 757, RFF 4 725 forwards the SFH-encapsulated packet towards the egress 755 of the SFP at the operation marked 9d in FIG. 10.

Service function chains may be decomposed into a series of sub-chains to simplify SFC management. When rendered into a service function path, each sub-chain may be viewed as a self-contained SFP segment. In some cases, the self-contained SFP segment may use a dedicated subnet that is independent of the subnet used by the parent SFP; in this case, network address translation (NAT) must be performed at both the ingress and the egress of the SFP segment. In other cases, the SFP segment may be viewed as a nested subnet within the subnet of the parent SFP in which case network address translation is not necessarily required.

Figure 11A:
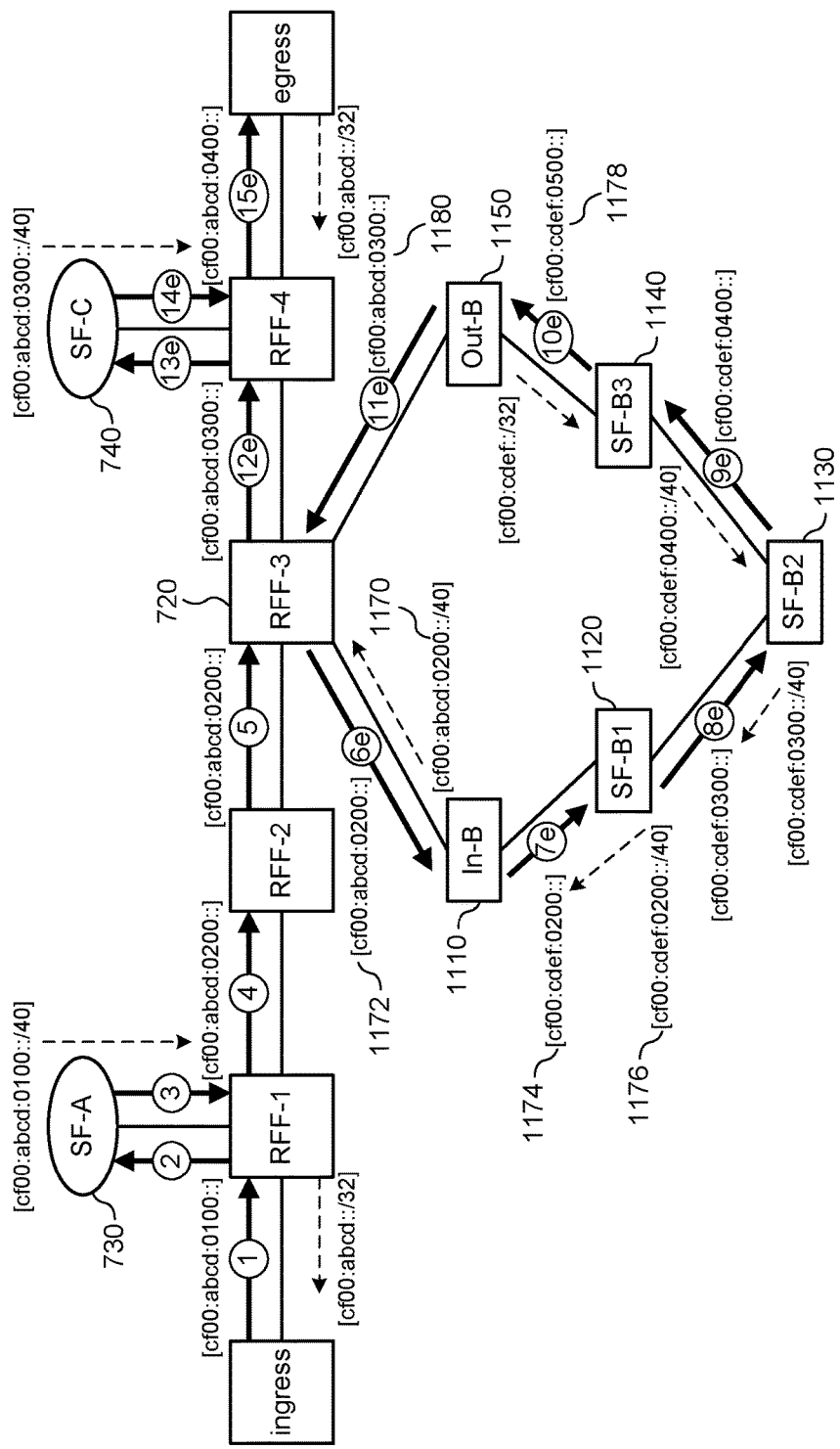
FIG. 11A illustrates a hierarchical service function path with network address translation, according to an embodiment of the present invention.

Beginning from the service function path of FIG. 7A and with reference now to FIG. 11A, the present example assumes that SF B is decomposed into a sequence of service functions resulting in the SFP of FIG. 11A. The component service functions (SF B1 1120, SF B2 1130, SF B3 1140) are contained within an SFP segment that has been assigned the service path identifier [cf00:cdef::] that is different from the service path identifier [cf00:abcd::] used by the parent SFP. Within this SFP segment, [cf00:cdef:0200:/40] is assigned to SF B1 1120, [cf00:cdef:0300:/40] is assigned to SF B2 1130 and [cf00:cdef:0400::/40] is assigned to SF B3 1140.

The ingress node to the SFP segment, In-B 1110, advertises reachability to the subnet [cf00:abcd:0200::/40] 1170 that would have been assigned to SF B. An incoming packet is forwarded along the SFP from the ingress node to RFF 3 as described in operations marked 1-5 in FIG. 7A. When the SFH-encapsulated packet is received by RFF 3 720, it analyzes the destination address field in the SFH header [cf00:abcd:0200::] match it to the subnet 1170 advertised by the ingress node In-B 1110 and forwards the SFH-encapsulated packet towards In-B in the operation marked 6e in FIG. 11A.

The ingress node In-B 1110 performs a network address translation that replaces the service path identifier [cf00: abcd::] in the received SFH 1172 with the service path identifier of the SFP segment [cf00:cdef::]. In-B 1110 then forwards the SFH-encapsulated packet with its new destination address [cf00:cdef:0200::] 1174 towards the next SF in the SDP segment in the operation marked 7e in FIG. 11A.

The destination address in the SFH is matched to the subnet [cf00:cdef:0200::/40] 1176 advertised by SF B1 1120 (or its SN) and is ultimately received by SF B 1. Once SF B1 has finished processing the encapsulated packet, SF B1 (or its SN) creates a new destination address to insert into the SFH of the transport tunnel packet. The new destination address is created as follows, using a prefix length (pf) of 40: NextNodeIndex=8000:: >>(40−1)=0000:0000:0100:: and NextNodeAddress=cf00:cdef:0200:: +0000:0000:0100:: &/40=cf00:cdef:0300::.

SF B1 1120 inserts NextNodeAddress into the IPv6 destination address of the SFH of the transport tunnel packet and then forwards the packet towards the next SF in the SFP segment in the operation marked 8e in FIG. 11A where it is eventually received by SF B2 1130 advertising the subnet [cf00:cdef:0300::/40]. In the operations marked 9e-10e in FIG. 11A, SFH-encapsulated packets are forwarded following similar procedures performed by SF B2 1130 and SF B3 1140.

Based on routing advertisements from the egress node of the SFP segment, Out-B 1150, the SFH-encapsulated packet 1178 is forwarded through intermediate RFFs to Out-B. The egress node Out-B performs a network address translation that replaces the service path identifier and service function index of the SFP segment [cf00:cdef:0500::] in the received SFH 1178 with the service path identifier and service function index of the parent SFP [cf00:abcd:0300::]. Out-B then forwards the SFH-encapsulated packet with its new destination address [cf00:abcd:0300::] 1180 towards the next SF in the SFP in the operation marked 11e in FIG. 11A. In the operations marked 12e-15e of FIG. 11A, the SFH-encapsulated packet is then forwarded along the SFP towards the egress node as described in operations marked 8-11 of FIG. 7A.

Figure 11B:
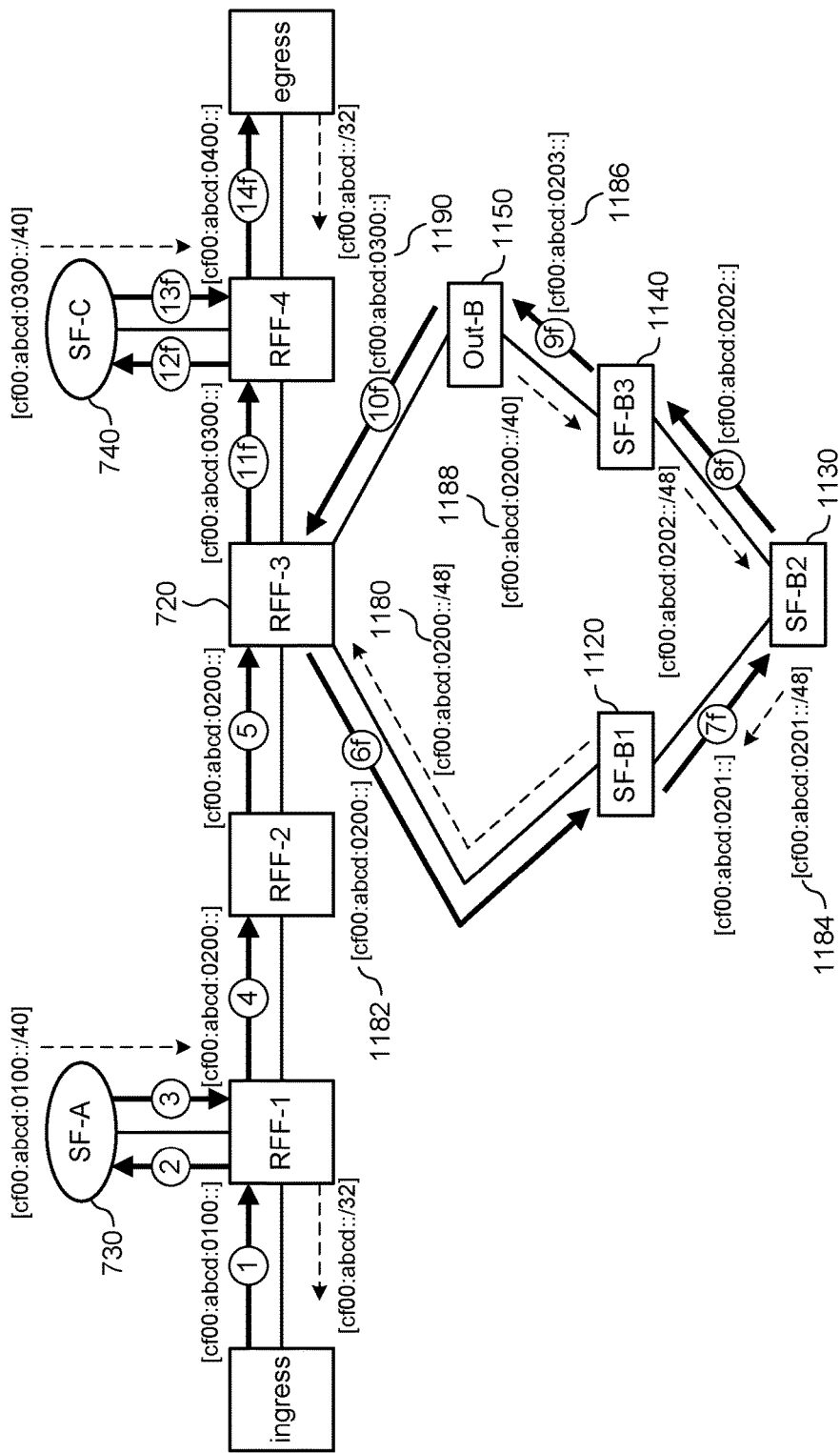
FIG. 11B illustrates a hierarchical service function path without network address translation, according to an embodiment of the present invention.

In order to operate without network address translation, the component service functions of the SFP segment (SF B1 1120, SF B2 1130, SF B3 1140) are assigned subnets within the subnet originally assigned to SF B [cf00:abcd:0200:/40] as shown in FIG. 11B. Within this SFP segment, [cf00:abcd: 0200::/48] is assigned to SF B1 1120, [cf00:abcd:0201::/48] is assigned to SF B2 1130 and [cf00:abcd:0202::/48] is assigned to SF B3 1140.

With reference to FIG. 11B, an incoming packet is forwarded along the SFP from the ingress node to RFF 3 720 as described in operations marked 1-5 in FIG. 7A. When the SFH-encapsulated packet is received by RFF 3, it matches the destination address in the SFH header [cf00:abcd:0200::] to the subnet 1180 advertised by SF B1 1120 (or its SN) using, for example, a longest prefix match and forwards the SFH-encapsulated packet 1182 towards SF B1 in the operation marked 6f in FIG. 11B.

Once SF B1 1120 has finished processing the encapsulated packet, SF B1 (or its SN) creates a new destination address to insert into the SFH of the transport tunnel packet. The new destination address is created as follows using a prefix length (pf) of 48: NextNodeIndex=8000:: >>(48-1) =0000:0000:0001:: and NextNodeAddress=cf00:abcd: 0200:: +0000:0000:0001:: &/48=cf00:abcd:0201::.

SF B1 1120 inserts NextNodeAddress into the IPv6 destination address of the SFH of the transport tunnel packet and then forwards the packet to the next SF in the operation marked 7f in FIG. 11B where it is eventually received by SF B2 1130 (or its SN) advertising the subnet [cf00:abcd: 0201::/48] 1184. In the operations marked 8f-9f in FIG. 11B, SFH-encapsulated packets are forwarded following similar procedures performed by SF B2 1130 and SF B3 1140.

Based on routing advertisements 1188 from the egress node of the SFP segment, Out-B 1150, the SFH-encapsulated packet 1186 is forwarded through intermediate RFFs to Out-B in the operation marked 9f in FIG. 11B. The egress node Out-B 1150 creates a new destination address to insert into the SFH of the transport tunnel packet using the destination address of the received packet [cf00:abcd: 0203::] 1186 and the subnet mask /40 of the parent SFP as follows: NextNodeIndex=8000:: >>(40−1)=0000:0000: 0100:: and NextNodeAddress=cf00:abcd:0203:: +0000: 0000:0100:: &/40=cf00:abcd:0300::. Out-B then forwards the SFH-encapsulated packet with its new destination address [cf00:abcd:0300::] 1190 towards the next SF in the operation marked 10f in FIG. 11B.

In the operations marked 11f-14f of FIG. 11B, the SFH-encapsulated packet is then forwarded along the SFP towards the egress node as described in operations marked 8-11 of FIG. 7A.

A service node may host multiple instances of a service function. In the SFP illustrated in FIG. 7A, there may be multiple instances of SF A 730 hosted within one or more service nodes connected to RFF 1 710. A particular grouping of service function instances may be referred to as a service function pool. Some service functions are stateless and do not retain any context information associated with the SFH-encapsulated packets that they process. In these cases, an incoming packet can be processed by any instance of the service function within the pool. However some service functions are stateful and retain context information in order, for example, to correlate operations across multiple packets of a packet flow. In these cases, it may be necessary to have the same instance of the service function process all of the packets related to a particular packet flow. In some embodiments, the auxiliary context 530 shown in the SFH of FIG. 5 may contain information inserted by the SFP ingress node that can be used in subsequent SF pools to forward a SFH-encapsulated packet to the service function instance that is maintaining the state required to process the encapsulated packet. The auxiliary context 530 may, for example, contain a correlation identifier assigned by the ingress node or may contain a hash value calculated over one or more fields of the encapsulated packet.

Having reference to FIG. 12, embodiments of the present invention provide for a network apparatus 1200, such as an apparatus configured to operate as a classifier, ingress node, service node or service function. The apparatus 1200 includes a microprocessor 1205, a network interface 1210 and a memory 1215 holding at least program instructions for execution by the microprocessor. The apparatus may optionally be provided using Network Function Virtualization or similar techniques. The apparatus can be provided as a single integral device or using different physical resources such as resources in a data network, in a data center, in a cloud resource center, or a combination thereof. The apparatus is configured to transmit and receive data packets using the network interface. The apparatus is configured to operate on the data packets using the microprocessor and/or memory, for example to encapsulate the data packets, modify or replace data in the packet headers, and/or operate on the payload of the data packet in accordance with a service function.

The above-described operation of the apparatus may be performed by one or more functional modules, which include at least the microprocessor, network interface and memory operating in concert in a particular manner. The device may also perform other operations, such as conventional routing and forwarding operations.

Various methods as disclosed herein may be implemented on one or more real or virtual computing devices, such as devices within a communication network control plane, devices operating in the data plane, or a combination thereof. Computing devices used to implement operations as described herein may include a processor operatively coupled to memory, the memory providing instructions for execution by the processor to perform the method as described herein.

Various embodiments of the present invention utilize real and/or virtual computer resources. Such computer resources utilize, at a hardware level, a set of one or more microprocessors operatively coupled to a corresponding set of memory components which include stored program instructions for execution by the microprocessors. Computing resources may be used to provide virtual computing resources at one or more levels of virtualization. For example, one or more given generic computer hardware platforms may be used to provide one or more virtual computing machines. Computer hardware, such as processor resources and memory, may also be virtualized in order to provide resources from which further virtual computing machines are built. A set of computing resources which are allocatable for providing various computing resources which in turn are used to realize various computing components of a system, may be regarded as providing a distributed computing system, the internal architecture of which may be configured in various ways.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for forwarding a packet along a service function path, the method comprising, by a network node:
   receiving the packet having a header which comprises an IPv6 destination address field; and
   forwarding the packet to one of: a service node associated with the network node; and a subsequent network node in the service function path, in accordance with a service path descriptor carried within the IPv6 destination address field, wherein said forwarding the packet further comprises:
   receiving one or more IPv6 route announcements;
   matching the service path descriptor carried within the IPv6 destination address field to one of the one or more IPv6 route announcements; and
   forwarding the packet according to the one IPv6 route announcement matching the service path descriptor carried within the IPv6 destination address field.

2. The method of claim 1, further comprising analyzing the IPv6 destination address field to make a determination that the IPv6 destination address field includes the service path descriptor, wherein said forwarding the packet is performed in response to the determination.

3. The method of claim 1, further comprising:
   determining an IPv6 address increment associated with the network node;
   modifying the value of the IPv6 destination address field in the header using the IPv6 address increment to indicate a next service function in the service function path which is to receive the packet; and
   forwarding the packet towards the next service function.

4. The method of claim 1, wherein the received packet further comprises a payload, the payload comprising a data packet encapsulated therein, the method further comprising processing the encapsulated data packet according to a service function associated with the network node device.

5. The method of claim 1, wherein the header of the received packet further comprises an IPv6 source address field comprising service context information in place of a network source address.

6. The method of claim 5, wherein the service context information comprises one or more of: a context group indicative of structure and content of the service context information included in the packet; a context type indicative of content of the packet; and information usable by one or more service functions along the service function path for processing the packet.

7. The method of claim 1, wherein the IPv6 destination address field includes one or more of: an indicator that the header of the packet includes the service path descriptor; an indicator that the packet is to be routed along the service function path; a service function index indicative of which of one or more service functions along the service function path is to receive the packet next, the service function index being updatable by the one or more network nodes; and auxiliary context usable by the one or more network nodes along the service function path.

8. The method of claim 7, wherein the service path descriptor includes an indicator that the packet is to be routed in a reverse direction along the service function path.

9. The method of claim 1, wherein the IPv6 destination address field includes auxiliary context is usable by the one or more network nodes along the service function path to identify which one of the one or more service functions along the service function path is to receive the packet next.

10. The method of claim 1, further comprising: transmitting a received second packet towards a destination address determined in accordance with an IPv6 destination address field of a header associated with the second packet, after determining that the header associated with the second packet does not include the service path descriptor.

11. The method of claim 1, wherein the packet includes a data packet encapsulated therein, the method further comprising decapsulating the encapsulated data packet by removing the header, and forwarding the decapsulated data packet towards a destination address determined in accordance with information in a header of the decapsulated data packet.

12. The method of claim 1, wherein the IPv6 route announcement is received in a routing protocol packet.

13. The method of claim 1, wherein the IPv6 route announcement is received from a path computation entity.

14. An apparatus for use within a service domain, the apparatus comprising:
   a network interface for receiving and transmitting a packet along a service function path, the packet having a header which comprises an IPv6 destination address field;
   a processor; and
   a memory device storing instructions that, when executed by the processor, cause the apparatus, in response to receipt of the packet via the network interface, to:
      forward the received packet to one of: a service node associated with the network node, and a subsequent network node in the service function path, in accordance with a service path descriptor carried within the IPv6 destination address field, wherein said forwarding the received packet further comprises:
         receiving one or more IPv6 route announcements;
         matching the service path descriptor carried within the IPv6 destination address field to one of the one or more IPv6 route announcements; and
         forwarding the received packet according to the one IPv6 route announcement matching the service path descriptor carried within the IPv6 destination address field.

15. The apparatus of claim 14, wherein the instructions, when executed by the processor, further cause the apparatus to analyze the IPv6 destination address field to make a determination that the IPv6 destination address field includes the service path descriptor, wherein said forwarding the received packet is performed in response to the determination.

16. The apparatus of claim 14, further comprising:
   determining an IPv6 address increment associated with the apparatus;
   changing the value of the IPv6 destination address field in the header using the IPv6 address increment to indicate a next service function in the service function path to receive the packet; and
   transmitting the packet over the network interface towards the next service function.

17. The apparatus of claim 14, wherein the received packet further comprises a payload, the payload comprising a data packet encapsulated therein, and wherein upon said forwarding, the encapsulated data packet is processed according to a service function associated with the service node or the subsequent network node.

18. The apparatus of claim 14, wherein the header of the received packet further comprises an IPv6 source address field comprising service context information in place of a network source address.

19. The apparatus of claim 18, wherein the service context information comprises one or more of: a context group indicative of structure and content of the service context information included in the packet; a context type indicative of content of the packet; and information usable by one or more service functions along the service function path for processing the packet.

20. The apparatus of claim 14, wherein the IPv6 destination address field includes one or more of: an indicator that the header of the packet includes the service path descriptor; an indicator that the packet is to be routed along the service function path; a service function index indicative of which of one or more service functions along the service function path is to receive the packet next, the service function index being updatable by the one or more network nodes; and auxiliary context usable by the one or more network nodes along the service function path.

21. The apparatus of claim 14, further configured to transmit a received second packet towards a destination address determined in accordance with an IPv6 destination address field of a header associated with the second packet, after determining that the header associated with the second packet does not include the service path descriptor.

22. The apparatus of claim 14, wherein the packet includes a data packet encapsulated therein, the apparatus further configured to decapsulate the encapsulated data packet by removing the header, and forwarding the decapsulated data packet towards a destination address determined in accordance with information in a header of the decapsulated data packet.

23. The apparatus of claim 14, wherein the IPv6 route announcement is received in a routing protocol packet.

24. The apparatus of claim 14, wherein the IPv6 route announcement is received from a path computation entity.

25. A method for processing and forwarding data packets at an ingress network node device in a packet data network, the method comprising, by the network node device:
   receiving a data packet;
   in response to a determination that the received data packet is to be forwarded along a service function path, encapsulating the data packet within a tunnel packet;
   inserting, into an IPv6 header of the tunnel packet, one or more of: a service path descriptor indicative of the service function path to be followed by the tunnel packet; and service context information usable by one or more service functions along the service function path for processing the data packet; and
   forwarding the tunnel packet towards a service function associated with the service function path.

26. An ingress network node device for use in a packet data network, comprising:
   a network interface for receiving and transmitting data packets;
   a processor; and
   a memory device storing instructions that, when executed by the processor, cause the ingress network node device, in response to a determination that a data packet received by the network interface is to be forwarded along a service function path of the service domain, to:
      encapsulate the data packet within a tunnel packet;
      insert, into an IPv6 header of the tunnel packet, one or more of: a service path descriptor indicative of the service function path to be followed by the tunnel packet; and service context information usable by one or more service functions along the service function path for processing the data packet; and
      transmit the tunnel packet towards the one or more service functions associated with the service function path.

\* \* \* \* \*